United States Patent [19]
Johnsen

[11] Patent Number: 4,606,069
[45] Date of Patent: Aug. 12, 1986

[54] APPARATUS AND METHOD FOR COMPRESSION OF FACSIMILE INFORMATION BY PATTERN MATCHING

[75] Inventor: Ottar Johnsen, Middletown, N.J.

[73] Assignee: AT&T Bell Laboratories, Murray Hill, N.J.

[21] Appl. No.: 503,333

[22] Filed: Jun. 10, 1983

[51] Int. Cl.⁴ .................... H04N 1/40; G06K 9/68
[52] U.S. Cl. .................. 382/56; 358/263; 382/34; 382/39
[58] Field of Search .......... 382/56, 30, 34, 39; 358/260, 263

[56] References Cited

U.S. PATENT DOCUMENTS

| | | | |
|---|---|---|---|
| 4,091,424 | 5/1978 | Widergren | 358/260 |
| 4,163,214 | 7/1979 | Komori et al. | 340/146.3 |
| 4,183,013 | 1/1980 | Agrawala et al. | 340/146.3 |
| 4,186,378 | 1/1980 | Moulton | 340/146.3 |
| 4,200,861 | 4/1980 | Hubach et al. | 340/146.3 |
| 4,259,661 | 3/1981 | Todd | 340/146.3 |
| 4,272,756 | 6/1981 | Kakumoto et al. | 340/146.3 |
| 4,281,312 | 7/1981 | Knudson | 340/146.3 |
| 4,288,782 | 9/1981 | Bader et al. | 340/146.3 |
| 4,308,523 | 12/1981 | Schapira | 340/146.3 |
| 4,317,109 | 2/1982 | Odaka et al. | 340/146.3 |
| 4,410,916 | 10/1983 | Pratt et al. | 358/263 |
| 4,463,386 | 7/1984 | Goddard et al. | 358/263 |
| 4,494,150 | 1/1985 | Brickman et al. | 358/263 |
| 4,499,499 | 2/1985 | Brickman et al. | 358/263 |

OTHER PUBLICATIONS

"International Digital Facsimile Coding Standards", *Proc. of the IEEE*, vol. 68, No. 7, Jul. 1980, by R. Hunter and H. Robinson, pp. 854–867.
"An Improvement of Kruse's Segmentation Algorithm", *Computer Graphics and Image Processing* 17, 1981, by Per-Erik Danielsson, pp. 394–396.
"Filling Algorithms for Raster Graphics", *Computer Graphics and Image Processing* 10, 1979, by Theo Pavlidis, pp. 126–141.
"Region Extraction Using Boundary Following", *Pattern Recognition and Artificial Intelligence* (C. H. Chen, Ed.) Academic Press, N.Y., 1976, by S. A. Dudani, pp. 216–232.
"A Means for Achieving a High Degree of Compaction on Scan-Digitized Printed Text", *IEEE Trans. on Computers*, vol. C-23, No. 11, Nov. 1974, by R. N. Ascher and G. Nagy, pp. 1174–1179.
"Combined Symbol Matching Data Compression System", *Proc. of the IEEE*, vol. 68, No. 7, Jul. 1980, by W. K. Pratt, P. J. Capitant, W. Chen, E. R. Hamilton and R. H. Wallis, pp. 786–796.
Ascher et al, "An Interactive System For Reading Unformatted Printed Text", *IEEE Trans. on Computers*, vol. C-20, No. 12, Dec. 1971, pp. 1527–1543.

Primary Examiner—Leo H. Boudreau
Attorney, Agent, or Firm—Barry H. Freedman

[57] ABSTRACT

A technique and apparatus for facsimile encoding wherein patterns isolated in each incoming image or picture are compared against stored library patterns, and an identification number associated with a matching pattern and its location in the facsimile are encoded in place of a pixel-by-pixel pattern description. The library of stored patterns used for matching purposes is organized such that frequently occurring patterns are examined early in the matching process, decreasing processing time. Identification numbers associated with matched patterns on each scanning line are numerically sorted, so that the ID's can be differentially encoded. At any time during pattern matching, detection of significant differences between the incoming pattern and a particular library pattern generates a reject decision, immediately terminating that match attempt. If desired features of the incoming patterns can be compared to library pattern features, using tight and then loose screening criteria, in order to preselect patterns used in the matching process.

16 Claims, 23 Drawing Figures

FACSIMILE PATTERN MATCHING SYSTEM

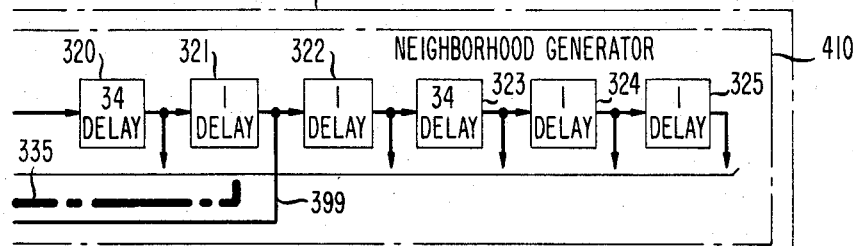
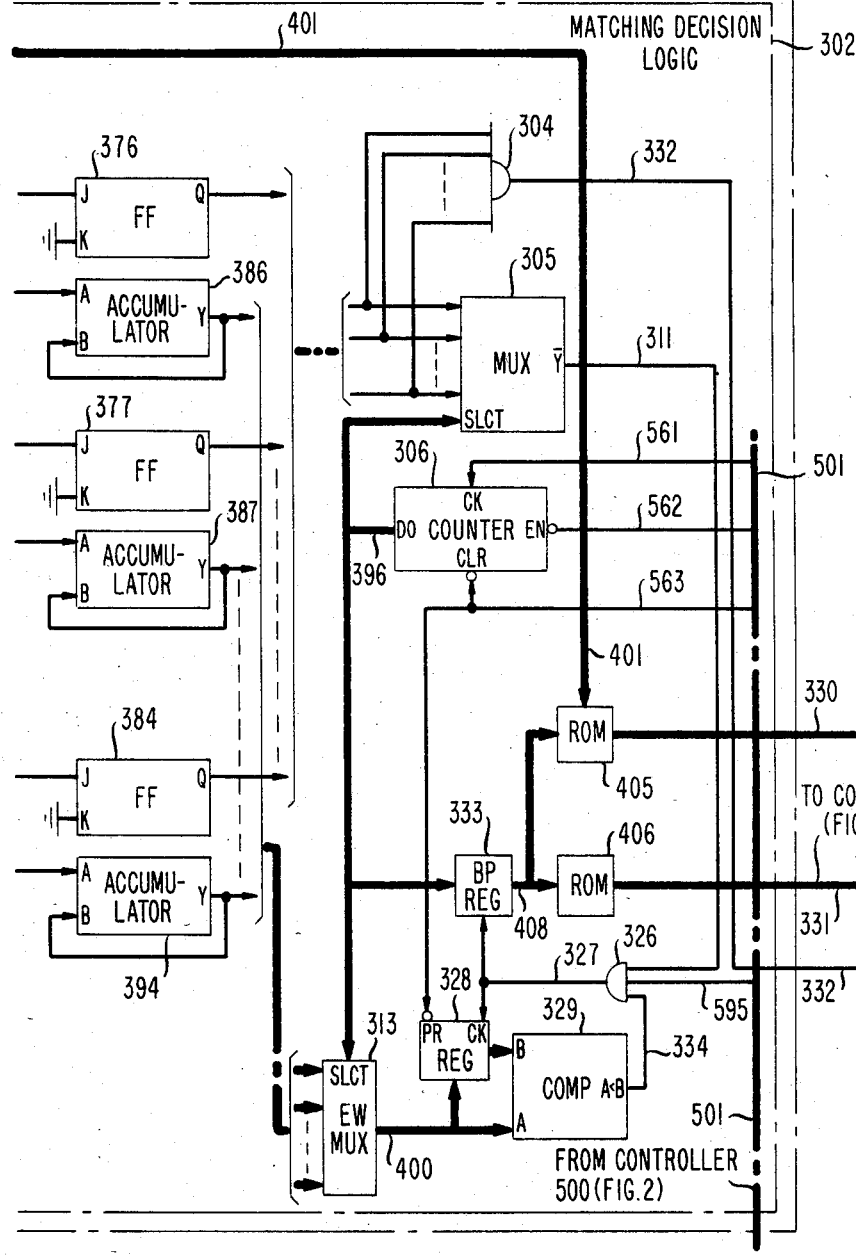

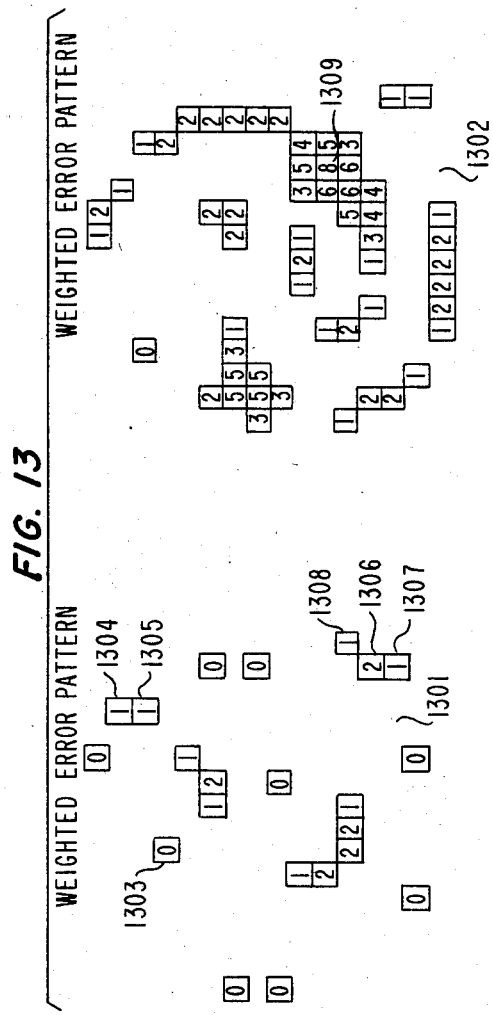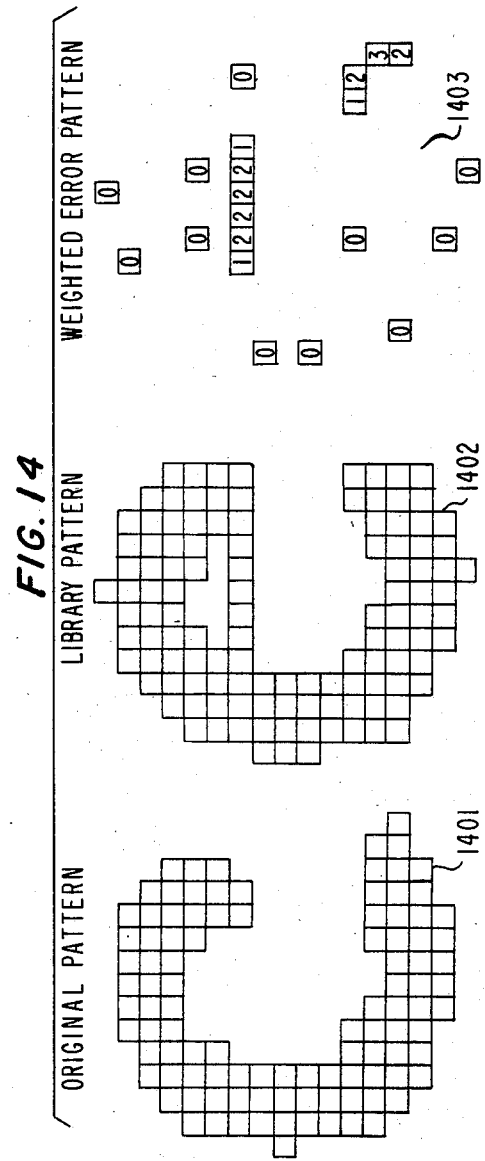

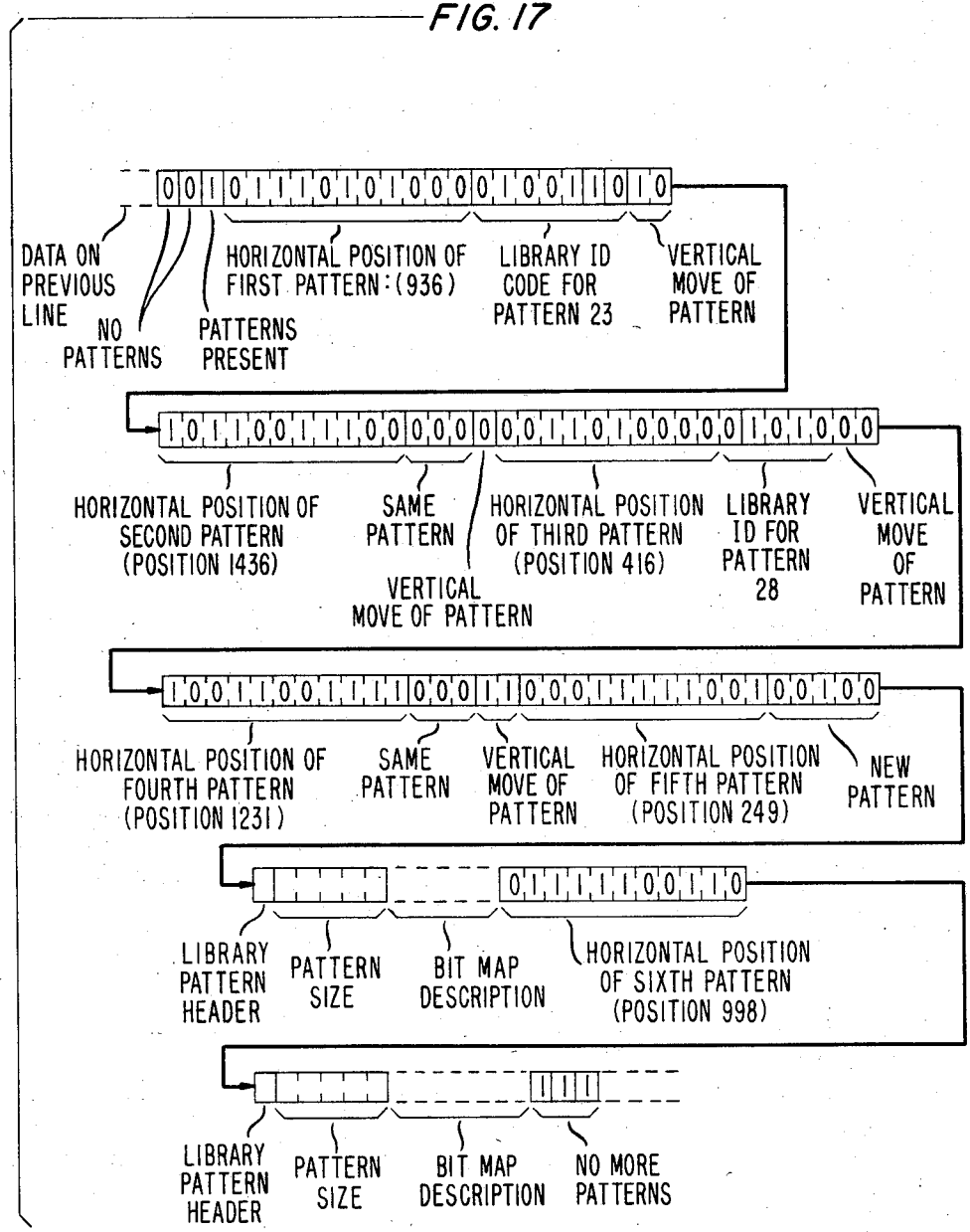

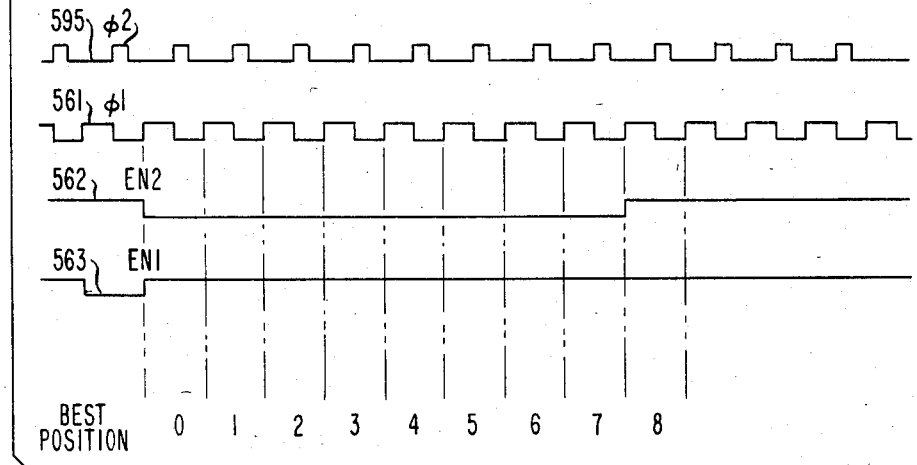
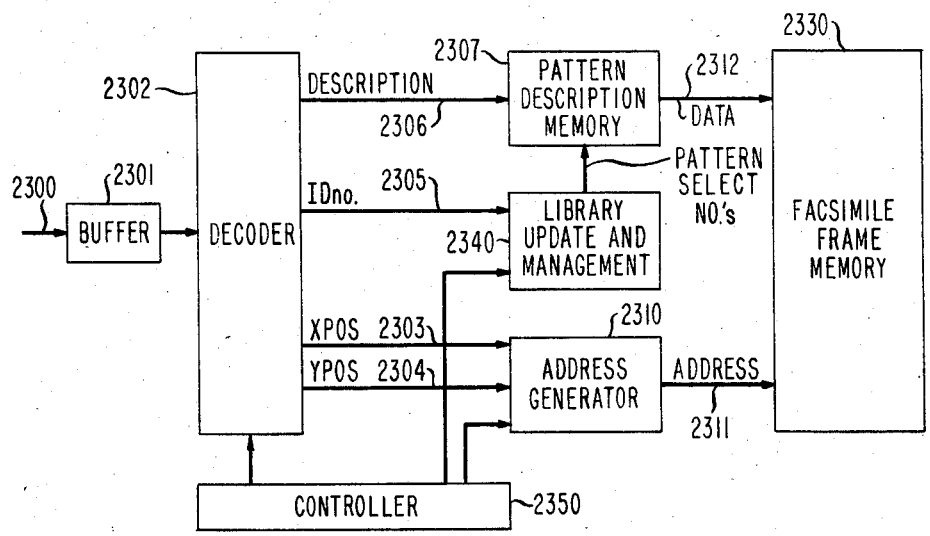

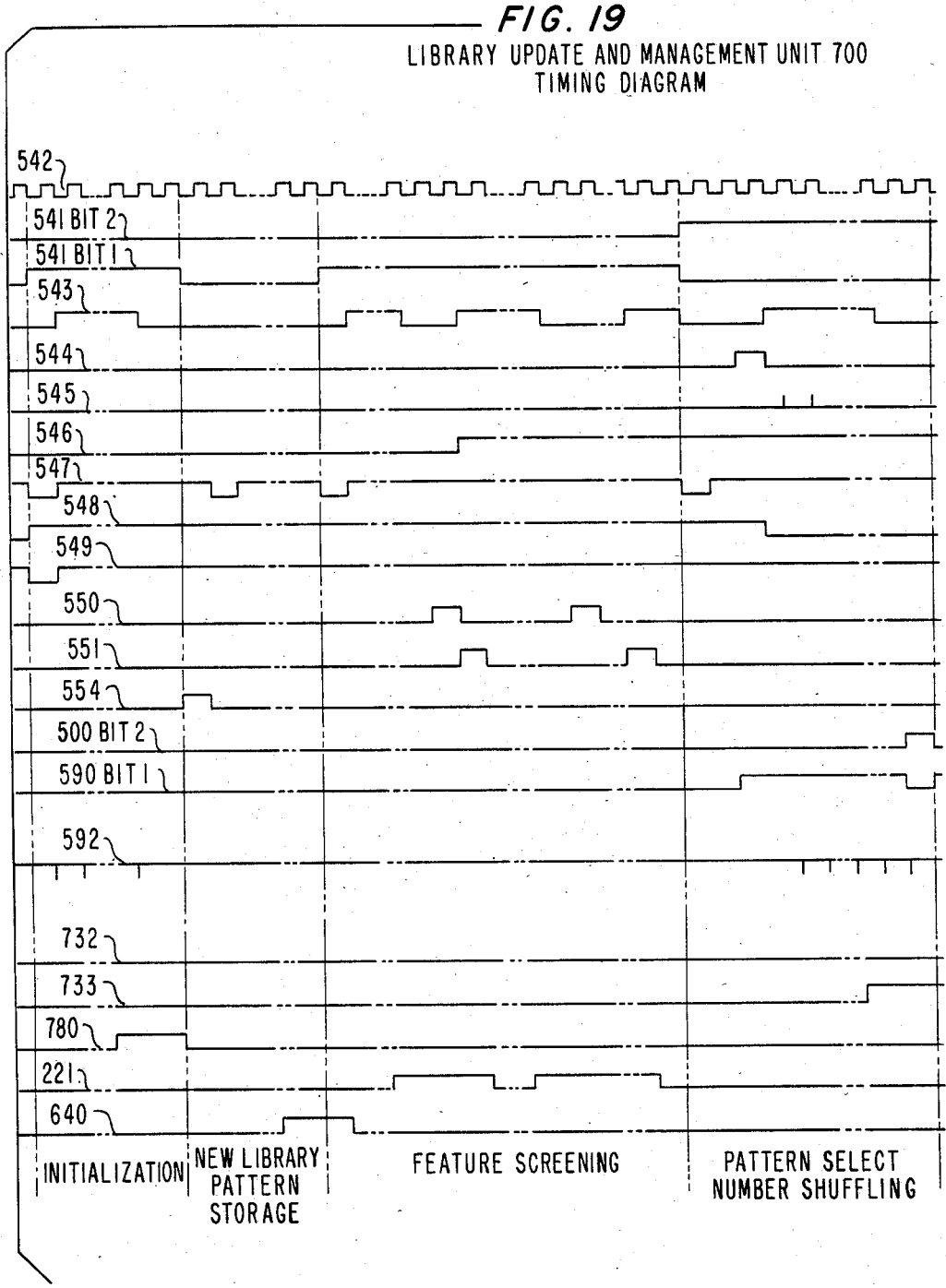

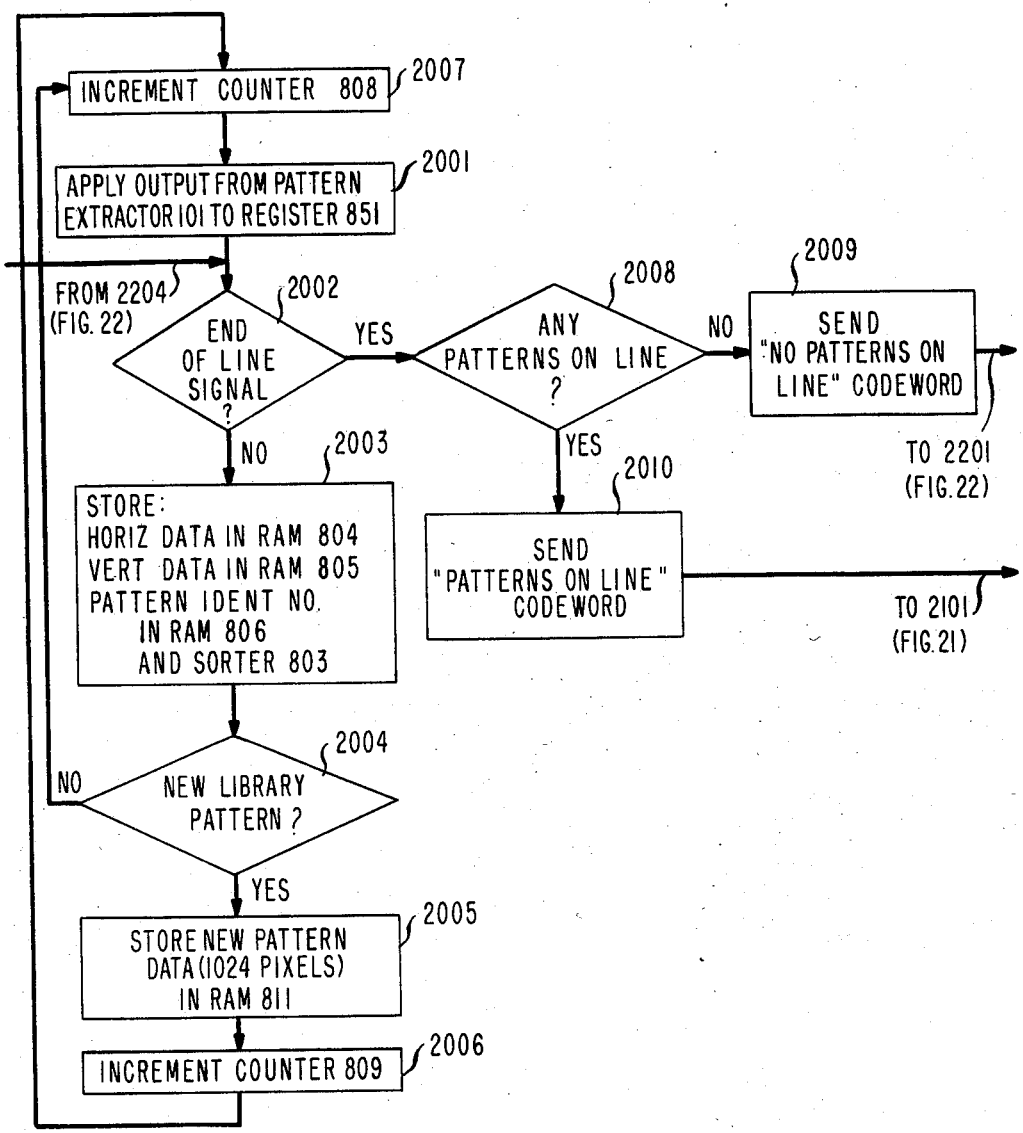

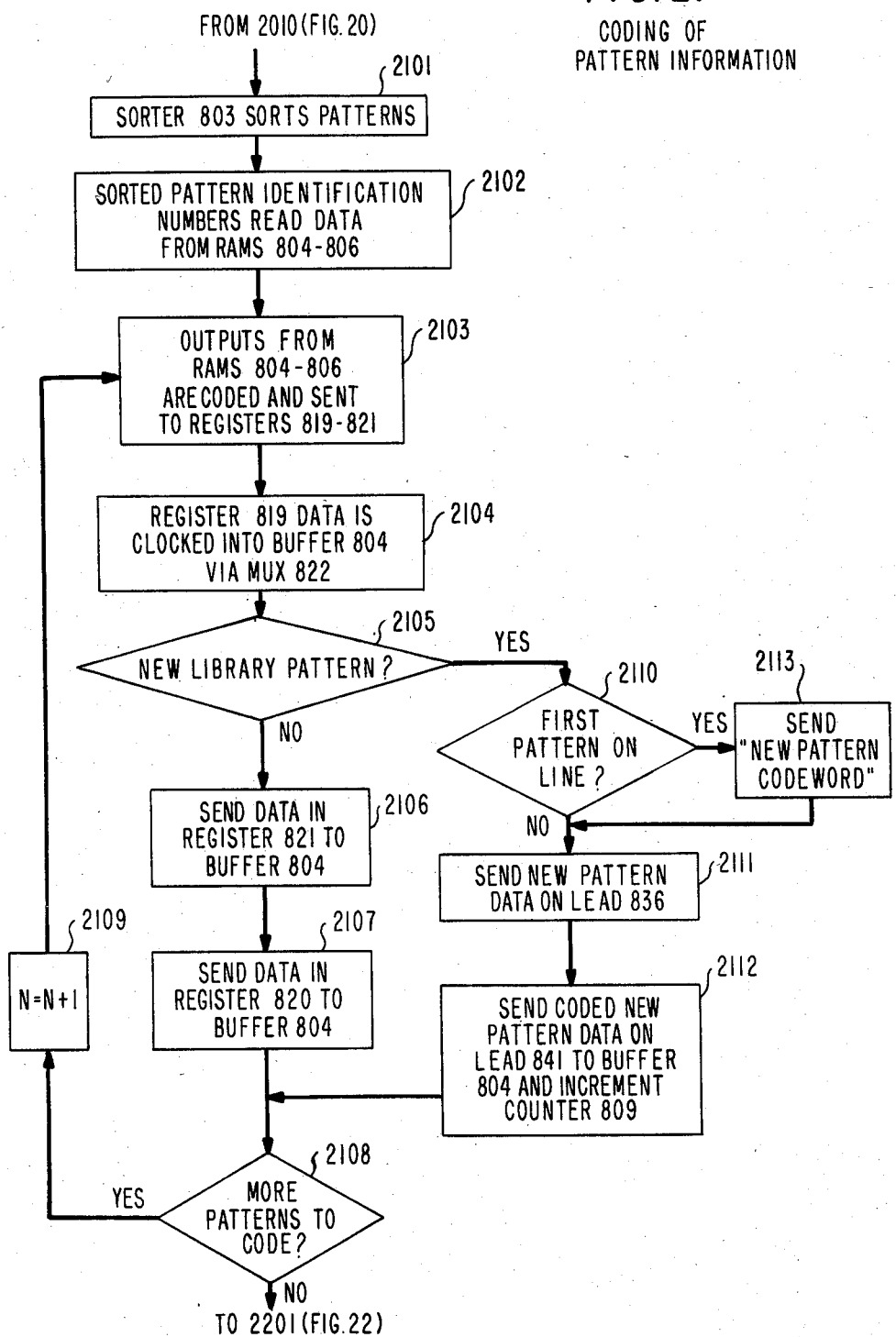

CODING OF
PATTERN INFORMATION

APPARATUS AND METHOD FOR COMPRESSION OF FACSIMILE INFORMATION BY PATTERN MATCHING

FIELD OF THE INVENTION

The present invention relates generally to facsimile information coding and, in particular, to a method and apparatus for compressing facsimile information using a pattern matching technique.

BACKGROUND OF THE INVENTION

Several conventional techniques for encoding two-level facsimile information use the microscopic properties of images by taking advantage of the statistical dependence between neighboring picture elements (pixels). This neighboring pixel dependence can be exploited by coding the connecting pixels that have the same level on a scan line. Another coding technique is to use the statistical dependence between neighboring pixels to predict the pixel levels and then code the resulting error picture. An example of a conventional facsimile coding scheme is the CCITT modified relative element address designate (READ) code described in Hunter and Robinson, "International Digital Facsimile Coding Standards", *Proceedings IEEE*, Vol. 68, No. 7, pp. 854-867, July 1980. These techniques (and various combinations thereof) significantly reduce the number of bits required to transmit the facsimile information, but additional improvements in efficiency are often desired or required in order to reduce transmission costs.

To increase efficiency, pattern recognition techniques (where the image is viewed as a combination of macroscopic patterns such as characters, lines, or black regions) can be used and the facsimile encoded with codewords to identify image patterns and their respective locations. This approach is generally more efficient than the pixel method because it uses a description which is closer to a perceptual level. Pattern recognition approaches used for coding two-level images are:

(a) Pattern (or image) understanding, in which certain patterns (character and font style) are recognized in accordance with the content of previously processed information; and (b) Pattern matching, in which new patterns are matched with previously transmitted patterns. In the latter case, if a match exists between the incoming pattern and a previously processed pattern held in storage, the incoming pattern is represented by a code that indicates the matching pattern identity and location in the facsimile being processed. Although the pattern (or image) understanding approach generally yields a higher image compression ratio, aesthetic details of a particular document can be lost. The pattern matching approach has a lower image compression ratio, but maintains more original image quality. It also reduces the risk of error since only slight modifications of pattern shape are allowed. Examples of pattern matching are described in Ascher and Nagy, "A Means for Achieving a High Degree of Compaction on Scan-Digitized Text", *IEEE Transactions on Computers*, Vol. C-23, pp. 1174-1179, November 1974; and Pratt et al, "Combined Symbol Matching Data Compression System", *Proceedings IEEE*, Vol. 68, No. 7, pp. 786-796, July 1980.

In various prior art pattern matching systems, symbols such as letters and numbers are matched. However, graphic elements such as line segments and black regions are not matched. In the present invention, a pattern matching technique for facsimile image encoding is described in which both types of patterns can be efficiently processed. In most conventional systems, pattern organization within a library is often inefficient, thereby requiring increased processing time to locate pattern matches. Accordingly, another object of the present invention is to improve the manner in which patterns are stored and accessed. Other objects of the present invention are to improve the manner in which code words are assigned to matching patterns, so that fewer bits are used to represent the transmitted information.

SUMMARY OF THE INVENTION

The foregoing and additional objects are achieved in the present invention by organizing a library of stored patterns (used for matching purposes) as a function of frequency of occurrence. This condition allows the most frequently occurring patterns to be examined first during the matching process, which effectively decreases the pattern matching search time. In addition, the identification (ID) numbers of matching patterns on a scanning line are sorted and code words are assigned to the difference between successive pattern ID's achieving greater information compression. Other features of the present invention allow patterns to be screened in accordance with a two-step approach, in which patterns with very similar characteristics are compared in the first step; if a match is not detected, patterns with less similar characteristics are then compared in a second step. In addition, the matching decision process compares local characteristics of incoming and library patterns and discontinues a match as soon as it is determined that the local characteristics are different.

DESCRIPTION OF THE DRAWINGS

The manner in which the objects of the invention are accomplished is more fully described in the following detailed description, which will be better understood by reference to the attached drawings, wherein:

FIGS. 4 and 5, when combined as illustrated in FIG. 6, are functional schematic diagrams of matcher 300 shown in FIGS. 1 and 2;

FIG. 13 illustrates two different examples of weighted error patterns formed by matcher 300;

FIG. 14 illustrates an example where a weighted error matching decision determined by matcher 300 would lead to a mismatch;

FIG. 17 illustrates an example of a complete message transmission.

FIG. 18 is a timing diagram for the best pattern position selection process shown in FIG. 5;

FIG. 19 is a timing diagram for library update and management unit 700;

FIG. 20 illustrates the steps in the pattern storage process performed in coder 800 of the present invention;

FIGS. 21 and 22 illustrate the steps in the pattern coding process performed in coder 800 of the present invention; and FIG. 23 is a block diagram of a receiver arranged to recover facsimile information encoded using the present invention.

DETAILED DESCRIPTION

General Description

Figure 1:
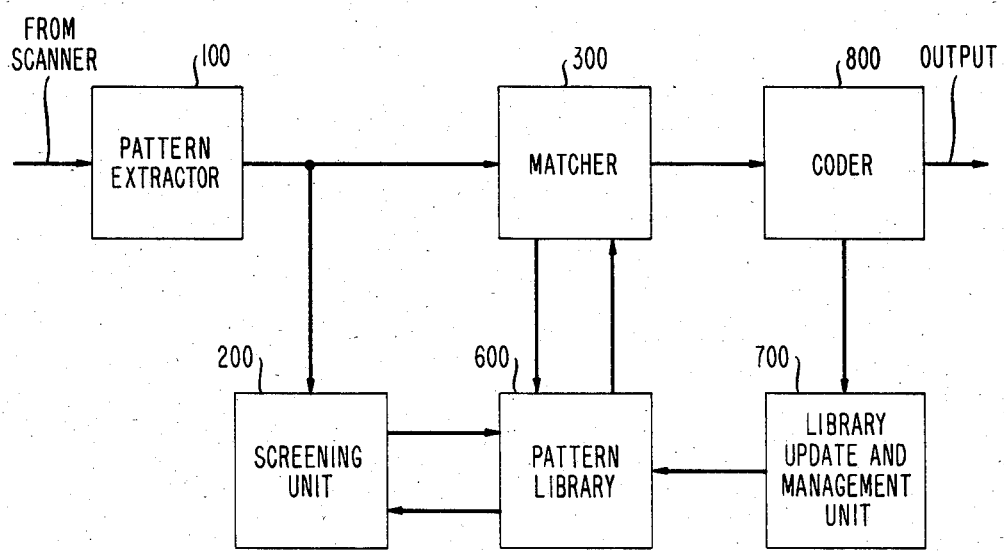
FIG. 1 is a simplified block diagram of the facsimile pattern matching system of the present invention.

FIG. 1 is a simplified block diagram of a system arranged in accordance with the present invention to provide facsimile encoding by pattern matching. A facsimile image scanner output (raw data in binary form indicating black/white intensity levels) is coupled to pattern extractor 100, where a pattern (symbol or nonsymbol) is extracted. This extracted pattern is then coupled to matcher 300, where it is compared with patterns stored in pattern library 600. If a match is detected, matcher 300 sends pattern position and library identification information to coder 800, where information describing the patterns contained in each scan line are stored. If a match is not detected, the incoming pattern is added to pattern library 600. At the end of each scan line, the library identification numbers for the matched patterns on the line are sorted in increasing order. These pattern identification numbers and descriptions are coded, and then coupled to a buffer (not shown) for storage and subsequent transmission. In accordance with a feature of the present invention, screening unit 200 reduces the time required for pattern matching by using a two-step (fine and coarse) pattern screening process. First, patterns from library 600 with characteristics (or features) very similar to the incoming pattern characteristics are sent to matcher 300. In the few cases where no match is detected, a second (much looser) screening process is initiated. In accordance with another feature of the present invention, library update and management unit 700 adds, deletes, and organizes library patterns stored in library 600 for the most expedient match and efficient coding.

Figure 2:
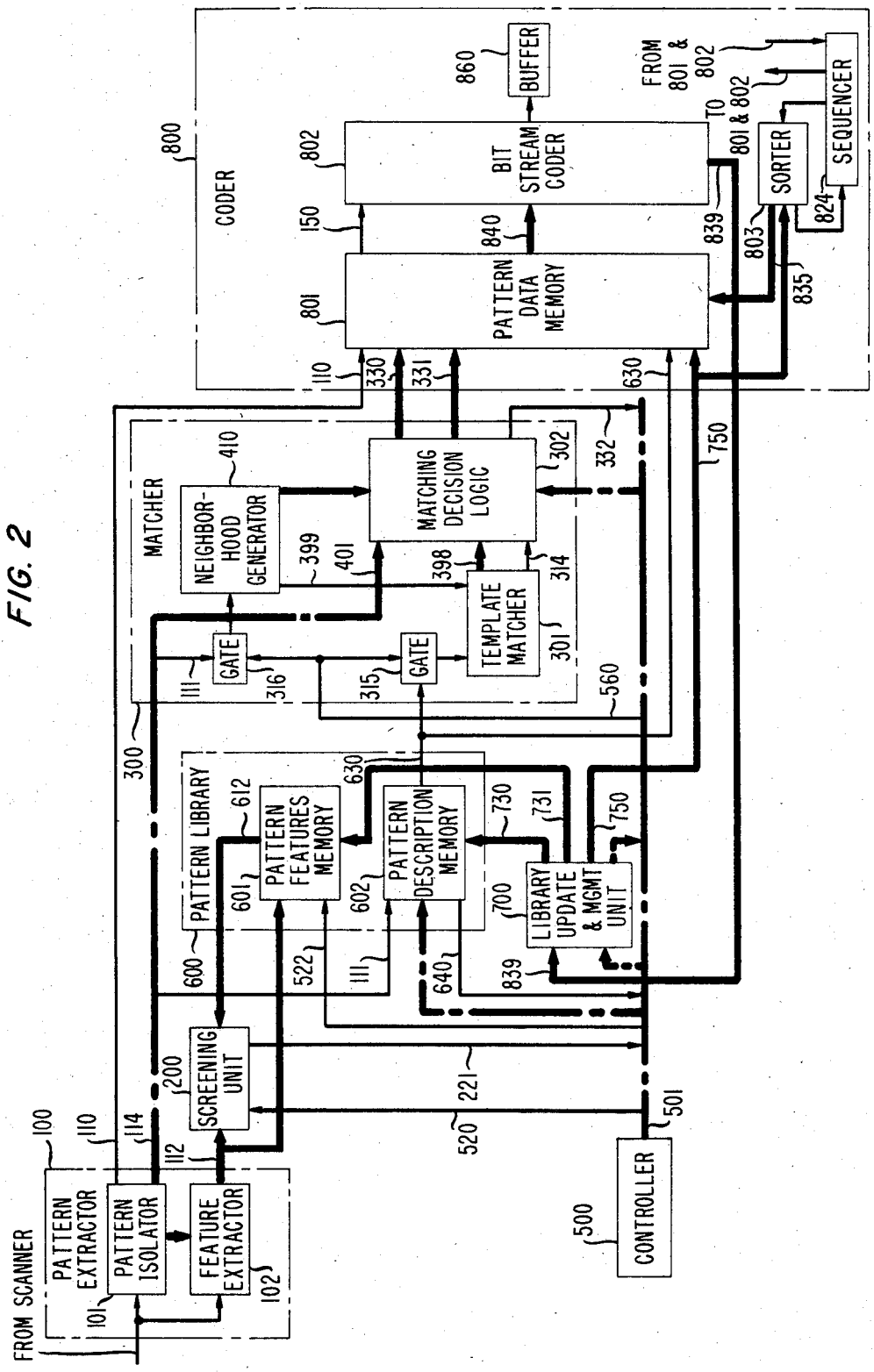
FIG. 2 is a more detailed block diagram illustrating the facsimile encoding by pattern matching process and apparatus of the present invention.

FIG. 2 is a more detailed block diagram of the facsimile encoding apparatus shown in FIG. 1, which is used to compress facsimile information for pattern matching applications. An input signal representing a facsimile image is typically obtained from a conventional facsimile image scanner, which sequentially examines the image along a series of parallel scan lines, each running from left to right from the top to the bottom of the image. The scanner output is typically a series of bits, each representing the on/off condition of a picture element (pixel) in the image. The input signal is applied to pattern extractor 100, where the image is examined line by line. Pattern isolator 101 isolates patterns, which in this context can be either a symbol (a set of connected black pixels surrounded by white pixels) or a nonsymbol (fraction of black region). Simultaneously, feature extractor 102 extracts preselected pattern features (e.g., pattern length, pattern height and white run information) which are then used for comparison with library pattern features. The feature extractor output on signal bus 112 is coupled to screening unit 200 (where pattern screening is performed) and pattern library 600 (for possible storage). Pattern isolator 101 and feature extractor 102 can be arranged in a conventional manner as described in S. A. Dudani, "Region Extraction Using Boundary Following", *Pattern Recognition and Artificial Intelligence* (C. H. Chen, Ed.), pp. 216–232, Academic Press, New York, 1976; Theo Pavlidis, "Filling Algorithms for Raster Graphics", *Computer Graphics and Image Processing* 10, pp. 126–141, 1979; and Per-Erik Danielsson, "An Improvement of Kruse's Segmentation Algorithm", *Computer Graphics and Image Processing* 17, pp. 394–396, 1981.

In order to reduce the time required for pattern matching, the facsimile encoding apparatus shown in FIG. 2 is arranged so that library patterns with features similar to the incoming pattern features are identified by screening unit 200. Incoming pattern features applied on signal bus 112 are compared with library pattern features applied on signal bus 612. Screening unit 200 output on lead 221, which identifies the stored patterns most likely to match the incoming pattern, is coupled to matcher 300 via controller signal bus 501 and lead 560. Screening unit 200 is controlled by a timing signal coupled from controller 500 on lead 520. Advantageously, in accordance with the present invention, a two-step screening process initially sends library patterns with features very similar to the features of the incoming pattern to matcher 300. If necessary, patterns with less similar features are then examined. If no match is detected, the incoming pattern is added to pattern library 600, where it is subsequently used for future pattern matching.

Pattern library 600 includes pattern features memory 601, which stores pattern features, and pattern description memory 602, which stores pattern descriptions. The stored pattern features can typically include:

(a) pattern length (b) pattern height (c) number of horizontal white runs (connected white pixels) on a scan line, preceded and followed by black runs (connected black pixels) on a scan line; and (d) number of vertical white runs preceded and followed by black runs.

Pattern features stored in memory 601 are received via signal bus 112 from feature extractor 102, while read/write control is provided via lead 522 from controller signal bus 501. Pattern feature update is accomplished using address information coupled to pattern features memory 601 from library update and management unit 700 via signal bus 731. The output from pattern features memory 601 on signal bus 612, representing the stored features for selected patterns, is applied to screening unit 200.

When no match is detected, the incoming pattern description is stored in pattern description memory 602. This input to pattern description memory 602 is received from pattern isolator 101 via signal bus 114 and lead 111. Stored pattern location descriptions are sent from library 600 to matcher 300 and coder 800 via bus 630. The output from pattern description memory 602 on lead 640 is coupled to controller signal bus 501 for timing control purposes.

Library update and management unit 700 provides the following:

(a) allows incoming patterns to become new library patterns, and deletes seldom used patterns stored in pattern description memory 602 as required;

(b) organizes patterns stored in library 600 for the most expedient pattern match; and (c) organizes pattern library 600 for efficient pattern identification coding, allowing short codewords to be assigned to the patterns which are most often used.

Although a detailed description of pattern identification coding accomplished in coder 800 is set out below, it is worthwhile to review here the general concept used in the present invention. An example of library pattern identification coding is shown in Table 1.

TABLE 1

| Library Pattern Identification Coding Table | | |
|---|---|---|
| Symbol | Codeword | Codeword length |
| same pattern | 000 | 3 |
| library pattern 1–16 | 1XXXX | 5 |
| new pattern | 00100 | 5 |
| library pattern 17–32 | 010XXXX | 7 |
| library pattern 33–64 | 0011XXXXX | 9 |
| library pattern 65–128 | 00101XXXXXX | 11 |
| library pattern 129–512 | 011XXXXXXXXX | 12 |

In the coding example of Table 1, codewords containing from 3 to 12 bits are used to code 512 pattern identification numbers. Assuming that lower identification numbers are assigned to more frequently occurring patterns, increased coding efficiency is achieved by assigning short codewords to the most frequently used patterns (e.g., identification numbers 1–16) and longer codewords (e.g., 011XXXXXXXXX) to the least used patterns (e.g., identification numbers 129–512). Also, special codewords representing "same" pattern (000) and "new" patterns (00100) increase the coding efficiency. The same pattern codeword (000) indicates that the transmitted pattern is the same as the previously transmitted pattern. This arrangement is useful particularly for processing printed or typewriter text, where the line-by-line search for a new pattern often detects the same character several times on a line. Using the new pattern codeword (00100) eliminates the need to generate a new library pattern identification number. The variable length codeword scheme just described results in an average library pattern identification codeword length of less than seven. By comparison, conventional fixed length codeword schemes require nine bits per pattern. Still greater efficiency is possible when using the sorting procedure described below. Even though the present invention contemplates reassignment of library pattern identification numbers based upon frequency of occurrence, it advantageously provides for library pattern updating and identification coding only at the end of each scan line. Therefore, a library pattern identification number is changed only once on a line, even if several different incoming patterns match a library pattern on one particular line.

Inputs to library update and management unit 700, representing new library pattern identification numbers, are received from coder 800 on signal bus 839, while the required timing and control signals generated in controller 500 are applied to unit 700 via controller signal bus 501. The output from library update and management unit 700 on signal bus 730 couples library pattern address information to pattern description memory 602 in pattern library 600. Pattern feature addresses are coupled from library update and management unit 700 to pattern features memory 601 in pattern library 600 via signal bus 731. Output signal bus 750 couples library identification numbers from library update and management unit 700 to pattern data memory 801 in coder 800.

By virtue of the screening performed in screening unit 200, only library patterns which have features closely resembling the features on each incoming pattern are coupled from pattern description memory 602 via gate 315 to template matcher 301 in matcher 300, where the actual pattern matching is performed. This output from pattern description memory 602 is also applied to pattern data memory 801 in coder 800, via bus 630. Incoming isolated patterns from pattern isolator 101 are coupled via lead 111 and gate 316 to neighborhood generator 410, where they are delayed for the matching process described below. The output from neighborhood generator 410 is then coupled via lead 399 to template matcher 301. Both gates 315 and 316 are controlled by an output from controller 500 on lead 560.

The two input signals applied to template matcher 301, which represent the delayed incoming pattern and the library pattern, are superimposed in matcher 301 to create an "error pattern", which contains logical ones in the locations where the two patterns are different. Illustratively, a total of nine template matches between the incoming and library pattern are attempted so that a small misalignment between the two patterns can be accounted for in a convenient manner. One match is attempted by aligning the upper left pixel of the block of pixels containing the incoming pattern with the block of pixels containing the library pattern. The other eight matches are attempted by moving the library pattern horizontally or vertically one pixel, or both vertically and horizontally by one pixel in all possible directions. Since there can be times when two or more pattern alignments lead to a match, the position with the lowest weighted error summation is chosen. As explained in more detail below, the weighted error is determined by counting the number of adjacent error pixel neighbors.

Figure 11:
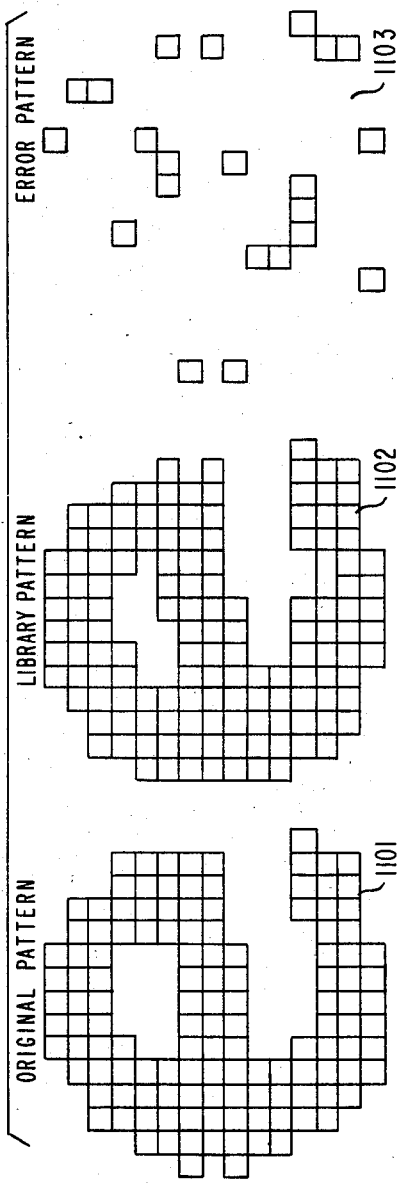
FIG. 11 illustrates an example of template matching as performed by matcher 300 for two similar patterns.
Figure 12:
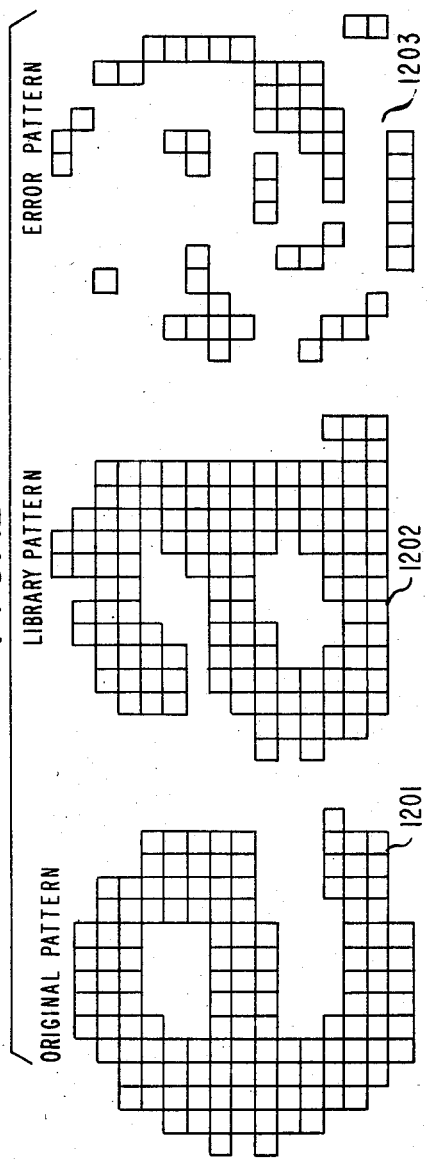
FIG. 12 illustrates an example of template matching as performed by matcher 300 for two different patterns.

The error pattern created by template matcher 301 is coupled to matching decision logic 302 by signal bus 398. Here, the error pattern is processed to detect whether a match has occurred, and to determine which relative position of the library pattern attains the best possible match. One known error evaluation approach is to simply count the number of errors (logical ones) in the error picture and establish a threshold for the matching decision. However, this simple error counting approach can lead to mismatches and undetected matches because the error count for two similar patterns is sometimes higher than the count for two different patterns (caused by digitization noise). The foregoing is illustrated in FIGS. 11 through 14. In FIG. 11, an original pattern 1101 and a library pattern 1102 consisting of the same letter "e" generated by two different scanning cycles, produce an error pattern (1103) with numerous errors, which tend to be randomly distributed. By way of comparison, in FIG. 12, an original pattern 1201 and a library pattern 1202 consisting of different letters "e" and "a", produce an error (1203) with clusters of erros where structural differences exist. By weighting the errors in accordance with their proximity to other errors, the examples of FIGS. 11 and 12 can be differentiated. Such error weighting is illustrated in FIG. 13, in which weighted error patterns 1301 and 1302 correspond to error patterns 1103 and 1203 of FIGS. 11 and 12, respectively. In FIG. 13, a weight for each error is assigned by determining the number of adjoining errors. For example, error 1303 is completely isolated, and therefore has a weight of "0". Errors 1304 and 1305 adjoin each other, giving both a weight of "1". Error 1306, adjoining errors 1307 and 1308, has a weight of "2". Error 1309, completely surrounded by errors, has a maximum weight of "8". Examination of pattern 1301 in FIG. 13 reveals that the maximum weighted error is two (low), indicating that the original and library patterns in FIG. 11 are similar. On the other hand, the maximum weighted error in pattern 1302 is eight (high) indicating that the original and library patterns in FIG. 12 are different. However, even the weighting just described is sometimes inadequate. For example, as shown in FIG. 14, an original pattern 1401 and a library pattern 1402 consisting of the different letters "c" and "e", produce a weighted error pattern 1403 with a maximum weighted error of only three. This low value might be incorrectly interpreted as a match, illustrating that using only the weighted error is not sufficient to form an accurate matching decision.

In view of the foregoing, multiple rules for pattern matching are incorporated into the matching decision logic of the present invention, and a pattern match is deemed to exist only when the entire error pattern is processed without rejection. One set of such rules that can be used to determine when a reject occurs can be as follows:

(a) An error pixel has an error weight equal to or greater than a threshold value such as four, or (b) An error pixel has an error weight of two or more, and (i) at least two of the neighboring error pixels are not connected, and (ii) one of two pattern pixels used to obtain the error pixel has zero or eight surrounding black pixels.

Rule (a) takes account of most situations. Rule (b) uses additional local characteristics by looking for runs of connected error pixels which occur in isolated regions of the original pattern. It can be advantageous to use a lower threshold value in Rule (a) for patterns where one of the sizes is equal to the maximum allowable size.

Returning now to a description of FIG. 2, it will be seen that inputs to matching decision logic 302 are coupled from template matcher 301 on signal bus 398 and lead 314. These inputs represent error pattern bits and the neighborhood of the current error pixel in the library pattern, respectively. Matching decision logic 302 also receives an input from pattern isolator 101, representing the horizontal position of a pattern on a line, which is applied via signal bus 114 and bus 401. An additional input from neighborhood generator 410 on bus 335 consists of delayed incoming pattern pixels. Proper timing and control signals for matching decision logic 302 are coupled from controller 500 via controller signal bus 501. Matching logic 302 outputs, representing the X and Y pattern position coordinates, are coupled to coder 800 on busses 330 and 331, respectively.

Coder 800 receives library pattern identification numbers from library update and management unit 700 on signal bus 750, and horizontal and vertical position information describing pattern locations within images on signal busses 330 and 331, respectively. It also receives pixel-by-pixel pattern descriptions on lead 630 for each new pattern. Pattern storage memory 801 stores all incoming pattern identification numbers and description information until the end of each scan line, and then sorter 803 sorts the pattern identification numbers in increasing number order. The foregoing allows a differential coding scheme to be used, as explained below. Pattern identification numbers are coupled from pattern data memory 801 to bit stream coder 802 via signal bus 840. The sorted pattern identification numbers are coupled back to pattern storage memory 801 on signal bus 835, and to library update and management unit 700 on bus 839. Pattern description information stored in pattern storage memory 801 is applied to bit stream coder 802 via lead 110. Here, each "new" pattern description is coded, and the coded bits are coupled to buffer 860 for storage and subsequent transmission. Sequencer 824 controls coder 800 operation by:

(a) selecting appropriate storage locations for incoming information;

(b) detecting end of line and triggering sorter 803; and (c) directing bit stream coder 802 output to buffer 860.

Controller 500, which controls the timing and interaction of the various major units shown in FIG. 2, includes microcontrollers and associated PROMs to ensure that all operations are properly synchronized. Its output control signals are coupled to the appropriate functional elements via controller signal bus 501, as described more fully below.

Screening

Figure 3:
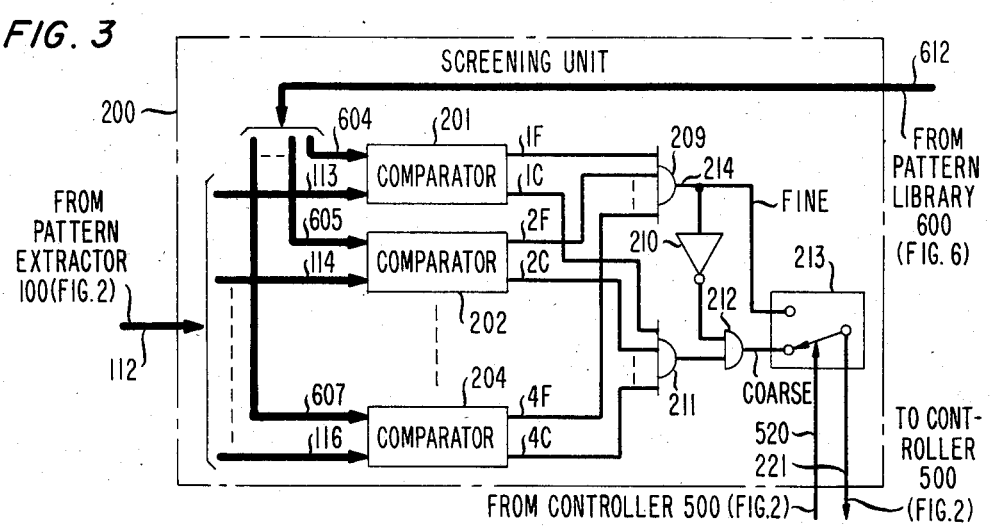
FIG. 3 is a functional schematic diagram of the screening unit shown in FIGS. 1 and 2.

FIG. 3 is a functional schematic diagram of screening unit 200. As previously stated, screening unit 200 compares features of incoming patterns with features of stored library patterns to determine which stored patterns should be further processed by matcher 300. Extracted features from the incoming image, such as pattern length and height, are coupled from feature extractor 102 by signal bus 112 to individual comparators 201 through 204 via leads 113 through 116. One comparator is provided for each feature being processed. Library pattern features are coupled from pattern features memory 601 by signal bus 612 to comparators 201 through 204 via leads 604 through 607. Comparators 201 through 204 can be designed to use a subtractor technique, where the difference between the two input signals representing a given feature of the incoming and library patterns is compared to a predetermined threshold level contained in a look-up table to make the appropriate screening decision; table look-up within comparators 201–204 can be implemented in a ROM. Alternatively, the subtractor function can be eliminated from comparators 201–204, and ROMs can be used to make screening decisions directly in response to input feature information. In either event, screening unit 200 advantageously includes fine/coarse switch 213 which is controlled by controller 500 via lead 520. With switch 213 in the upper position as shown in FIG. 3, the fine outputs (1F, 2F, . . . 4F) from comparators 201–204 derived by comparing the features of incoming and stored library patterns using a small difference threshold must all be high for a feature match to occur. Therefore, a relatively high degree of similarity must exist between the compared patterns. By way of comparison, the coarse outputs (1C, 2C . . . 4C) from comparators 201–204 are high when the features of incoming and stored library patterns fall within a larger tolerance range. If a feature match occurs in comparators 201 through 204 in the coarse mode, the high output of AND gate 211 is coupled through AND gate 212 and switch 213 to lead 221, and then to controller signal bus 501. With switch 213 in the upper or fine position, if a match occurs in comparators 201 through 204, a high output from AND gate 209 is coupled via lead 214, switch 213 and lead 221 to controller signal bus 501. Inverter 210 is used to insure that patterns selected during fine screening which do not match the incoming pattern are not allowed to be matched again during coarse screening. By using the screening process just described, features of stored library patterns are sequentially compared to features of the incoming pattern until a possible match is identified. At the time a possible match occurs, an output from screening unit 200 on lead 221 is coupled to controller signal bus 501 and sensed by controller 500. In response, an output from controller 500 on controller signal bus 501 is coupled to pattern description memory 602, causing the selected pattern stored in memory 602 to be applied to matcher 300 for matching purposes. Control signal levels for the pattern feature screening process are illustrated in FIG. 19.

Figure 4:
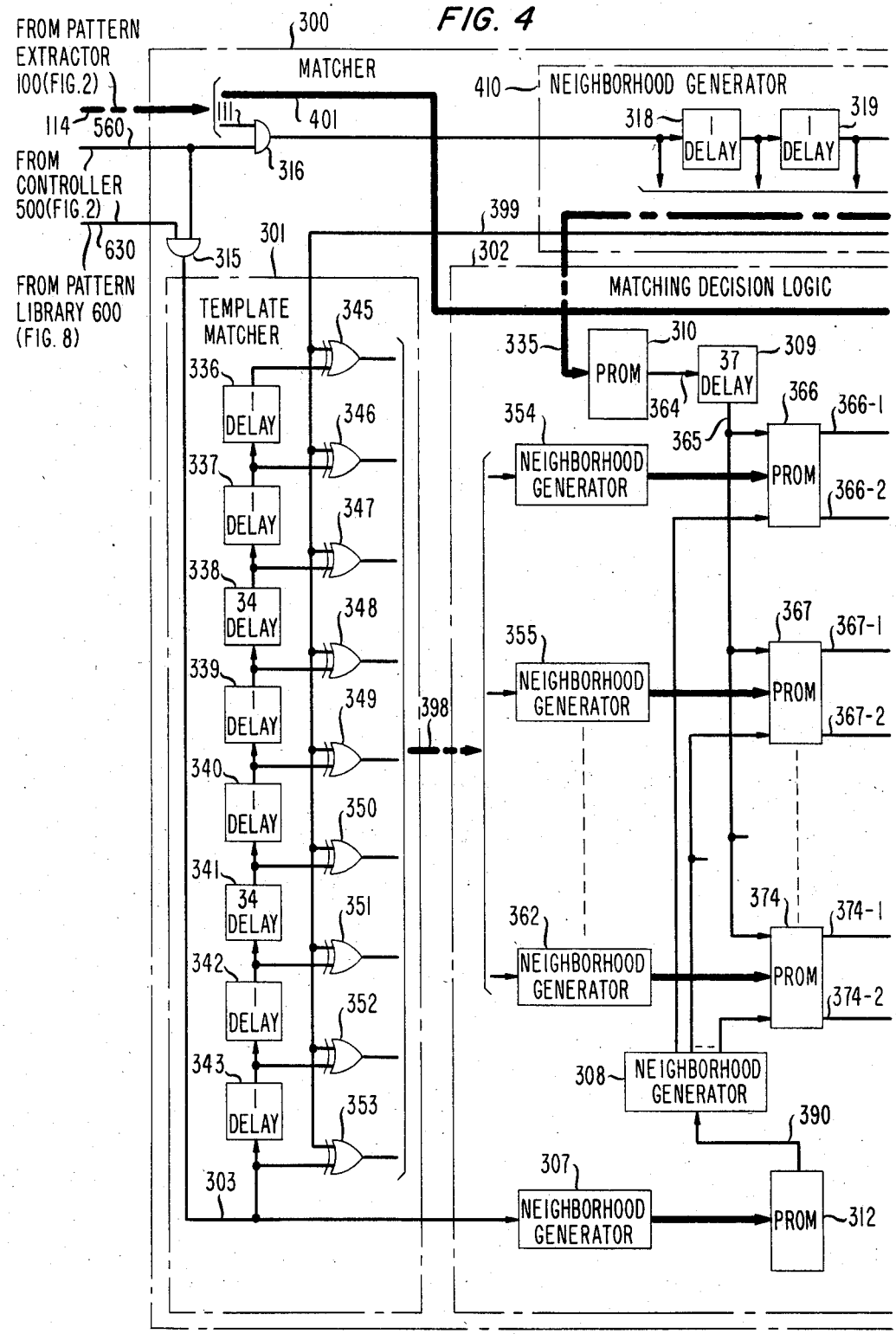

Although the previously described screening process speeds up the pattern matching sequence, it is not essential to system operation. In cases where the screening process is excluded, each incoming pattern is matched against all stored library patterns until a correct match is detected. FIGS. 4 and 5 (which are combined as shown in FIG. 6) are functional schematic diagrams of matcher 300. In the following description, it is assumed that the nominal pattern size that is isolated in pattern extractor 100 and processed by the apparatus of FIG. 2 is a square picture area that is 32 horizontal pixels wide by 32 vertical pixels high. In general, any connected set of black pixels within the 32×32 pixel block would be isolated as a pattern using, for example, the pattern isolation process described in the previously referenced paper by Dudani.

In the present invention, pattern isolation is accomplished using the following partition rules:

(a) the starting pixel (upper left corner) is always included, (b) connected black pixels on the right side or below the starting pixel are included, (c) connected black pixels to the left of the starting pixel are included, (d) the identified pattern is extracted and the remaining patterns are isolated using rules (a), (b) and (c), until all patterns are removed from the image.

Matching

Figure 7:
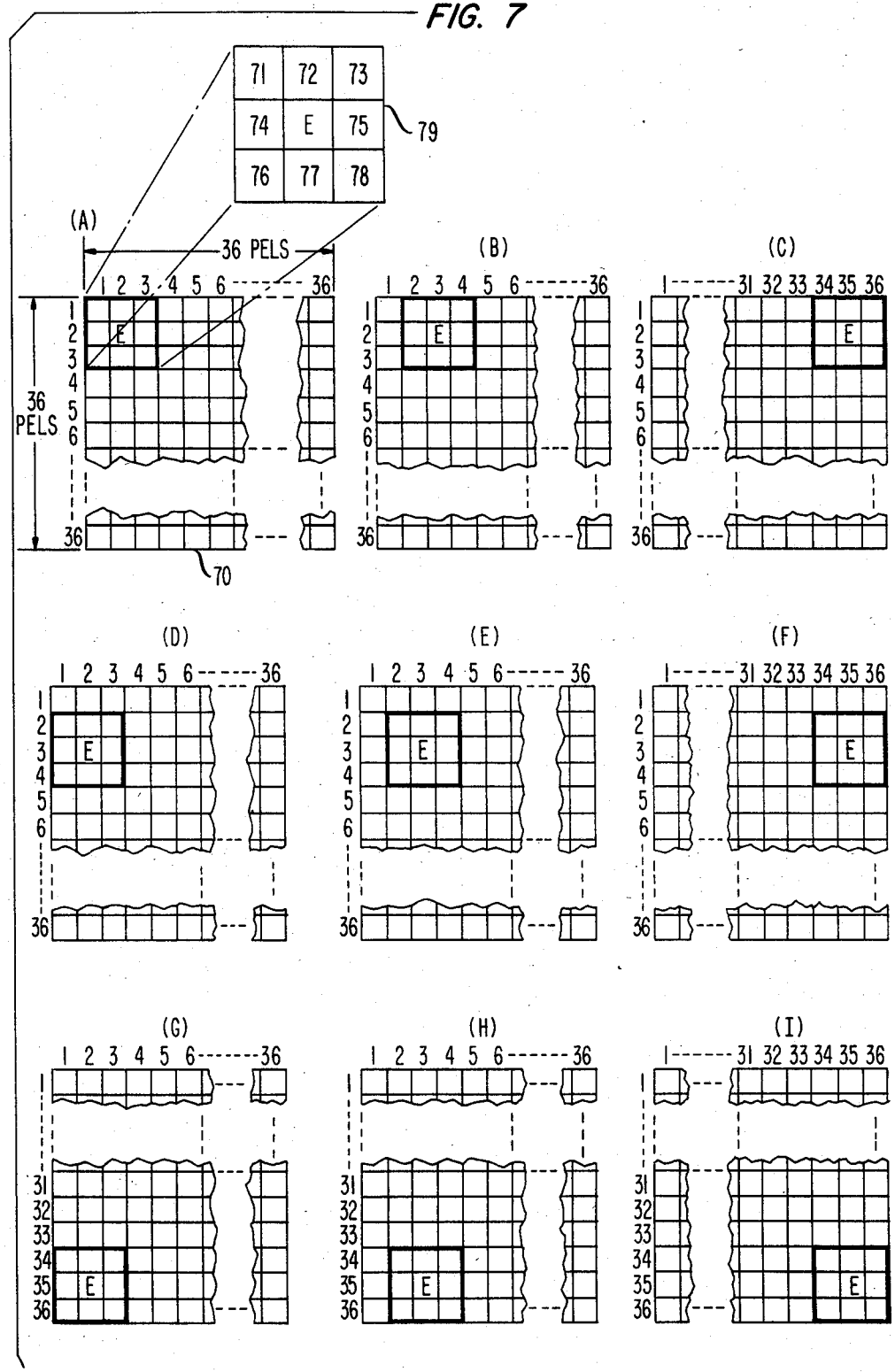
FIG. 7 illustrates the pattern scanning technique used for pattern matching in the apparatus of FIGS. 1 and 2.

An overview of the pattern scanning technique used in the pattern matcher of FIGS. 4 and 5 is illustrated in FIG. 7. An expanded 36×36 pixel block 70 is shown at nine selected processing intervals, labeled A through I. (The nominal 32×32 pixel block is expanded to simplify the template matching process.) During each interval, error information for nine pixels within a 3×3 pixel error scanning block 79 centered at a different location within block 70 is processed to compute the weighted error for each pixel and determine whether a match exists when the presently processed input pattern is matched to a library pattern. Error scanning block 79 includes a central pixel labeled "E" and eight surrounding pixels, 71-78. The scanning cycle is initiated with error scanning block 79 in the upper left corner of pattern block 70, as shown in FIG. 7A. During succeeding processing intervals which make up a scanning cycle for one stored library pattern, error scanning block 79 moves horizontally from the beginning to the end of a three pixel high row of pixels. Thus, after one processing interval, error scanning block 79 is in the location shown in FIG. 7B. When the end of the line is reached (after 34 processing intervals) error scanning block 79 is in the location shown in FIG. 7C. At this point, scanning block 79 retraces to the next vertical location shown in FIG. 7D. Processing on the second row of pixels continues by scanning horizontally from the location shown in FIG. 7E to the location in FIG. 7F. The same pattern scanning technique continues until the final row of block 70 has been scanned, as shown in FIGS. 7G, H and I. During each scanning cycle in which error scanning block 79 is scanned across pixel block 70, a total of 1,156 (34×34 pixels) error processing intervals will occur. During each interval, the weighted error value for the central error pixel "E" in error scanning block 79 is determined as a function of the eight neighboring pixels, as described below.

Returning to FIGS. 4 and 5, incoming patterns are coupled from pattern extractor 100 by signal bus 114 to AND gate 316 via lead 111. Library patterns are coupled from pattern library 600 by lead 630 to AND gate 315. When a control signal is coupled from controller 500 on controller signal bus 501 to lead 560, AND gates 315 and 316 are enabled to pass their inputs to template matcher 301 and neighborhood generator 410, respectively. The incoming pattern is coupled from neighborhood generator 410 to matcher 301 via lead 399, and the library pattern is coupled to matcher 301 from AND gate 315 via lead 303. Template matcher 301 accepts incoming and library patterns in a binary format and performs the necessary pattern matching operation between the two patterns. Since the pattern matching operation is susceptible to a mismatch caused by digitization noise, a match is desirably performed on several different relative positions of the incoming and library patterns. In the embodiment of FIGS. 4 and 5, the library pattern is shifted by plus and minus one pixel both in the horizontal and vertical directions, so that eight different relative positions are processed in addition to the non-shifted position. Those shifts for registration purposes are accomplished by using neighborhood generator 410 to delay the incoming pattern, and the delay elements 336–343 in template matcher 301 to delay the library pattern. To take account of mismatch near the edge of a block, the nominal 32×32 pixel block is expanded to a 36 by 36 pixel block. Expansion is provided by delaying address counter 618 in pattern description memory 602, as explained below. The actual matching is performed using a bit-by-bit exclusive OR function on the incoming and library patterns, as provided by exclusive OR gates 345–353. The resultant nine error patterns are then coupled to matching decision logic 302 for further processing.

In order to form weighted error values as each incoming pattern is compared to a selected library pattern in a total of nine different relative positions, signals representing both patterns must be delayed by one line plus one pixel (i.e., 37 pixel delays are required for a 36×36 pixel block). This is accomplished by using neighborhood generator 410 and template matcher 301, both of which include serial input shift registers with nine delayed outputs. The shift registers in neighborhood generator 410 comprise delay elements 318 through 325, while delay elements 336 through 343 are contained in template matcher 301. With proper synchronization, the outputs from delay element 321 of neighborhood generator 410 and delay element 340 of template matcher 301 correspond to the central pixel of the same 3×3 pixel block in the incoming and library patterns, respectively. The other delay elements are provided so that all of the eight remaining pixels in the 3×3 pixel blocks within the incoming and library patterns are simultaneously available. For example, the outputs of delay element 322 of neighborhood generator 410 and delay element 339 of template matcher 301 correspond to the pixel to the left of the central pixel in the same 3×3 pixel block within the incoming and library patterns, respectively. The outputs from delay element 323 of neighborhood generator 410 and delay element 338 of template matcher 301 correspond to the upper right pixel in the block, obtained by delaying the signals output from gates 316 and 315 by one line minus two pixels.

The existence of an error difference between the values of pixels in the incoming and library patterns is determined in the apparatus of FIGS. 4 and 5 by exclusive OR gates 345 to 353. Nine separate error determinations are made in these nine exclusive OR gates, due to the one pixel shift for registration purposes mentioned above. However, this feature is not necessary to practice the present invention. Thus, where evaluation of a single relative position between incoming and library patterns will suffice, each pixel in the incoming pattern, available at the output of delay element 322 on lead 399, is coupled to the input of exclusive OR gate 349, where its value is compared with the value of the corresponding pixel in the selected library pattern which is available at the output of delay element 340. Alternatively, where a one pixel shift for registration purposes is desired, eight pixels in the library pattern which surround the current pixel are also compared to the value of the pixel in the input pattern that is currently being processed. This is accomplished by connecting lead 399 to first inputs of the remaining eight exclusive OR gates 345–348 and 350–353. Second inputs to gates 345–348 and 350–353 are derived from individual outputs of template matcher 301, which provide suitable delays such that the presently processed pixel is compared with pixels in the library pattern that is displaced by one pixel in the up, down, left, right and diagonal directions.

The nine error outputs from exclusive OR gates 345 through 353, which include logical ones for each error or mismatch, are clocked into respective neighborhood generators 354–362 via signal bus 398. Neighborhood generators 354–362 each are functionally the same as neighborhood generator 410, but serve a different purpose. Specifically, these neighborhood generators are used to store and make available simultaneously the error status of pixels in the 3×3 pixel error scanning block 750 (described previously) which is centered around the particular pixel (E in FIG. 7) for which a weighted error value is to be computed. The weighted error value computation for a given central pixel depends, as described previously in FIGS. 13 and 14, on the number of surrounding pixels that are also errors. Thus, for any given pixel, a weighted error value between 0 and 8 is possible. Calculation of error weights in response to the error values in the error neighborhood of the presently processed pixel is performed in PROMs (programmable read-only memory) 366–374, which can be suitably programmed to provide weighted error values for each combination of neighborhood error values. Also, the information in PROMs 366–374 can actually implement a match reject decision in accordance with predetermined rules, as described below. In the latter event, it is advantageous to provide PROMs 310 and 312 which supply additional inputs to PROMs 366–374 via delay element 309 and neighborhood generator 308. In this embodiment, the output from PROM 310 indicates whether the incoming pattern contains either all black or all white pixels in the 3×3 pixel block which corresponds to the 3×3 error scanning block being processed, and, a high level signal on lead 365 indicates an all black or all white condition for the 3×3 pixel neighborhood in the incoming pattern. The output from PROM 312 indicates whether the library pattern is all black or all white in the same 3×3 pixel neighborhood, and a high level signal on lead 390 indicates an all black or all white pixel condition in this 3×3 pixel block. The 37 pixel delay provided by delay element 309 and the delay provided by neighborhood generators 307 and 308 (which are identical to neighborhood generator 410) both ensure proper system synchronization.

To summarize, PROMs 366–374 each process error information from an associated neighborhood generator 354–362 each of which provides error information for a different nine pixel scanning block; the scanning blocks are offset for a nominal position by one pixel in each direction, for registration purposes. PROMs 366–374, which each receive an 11-bit input: nine bits represent the error status of the present pixel and its eight neighbors, and are obtained from respective neighborhood generators 354–362, while two bits represent the black/white status of the same nine bit neighborhood in the incoming and library patterns and are obtained from PROMs 310 and 312, respectively.

Advantageously, PROMs 366–374 are look-up tables arranged to generate a reject decision on leads 366-1 through 374-1 if:

(a) an error pixel has an error weight equal to or greater than four, or (b) an error pixel has an error weight of two or more, and (i) at least two of the neighboring pixels are not connected, and (ii) one of two pixels used to obtain the error pixel has zero or eight surrounding black pixels. All of the information needed to make a decision in accordance with these rules is included in the 11 bits applied to each PROM.

The outputs from PROMs 366–374 on lines 366-1 to 374-1 are connected to the set inputs of J-K flip-flops 376–384, respectively. If a pattern is rejected, a logical one is applied to the corresponding J-K flip-flop, which remains high until the matching process for that pattern is completed. A second output from each of PROMs 366–374 on lines 366-2 through 374-2 is a two-bit error word, which is coupled to a set of nine corresponding accumulators, 386–394. This error word has meaning only when the pattern has not been rejected in accordance with the foregoing rules. In such case, when the error weight is three or less (and can thus be represented by a two-bit word), a running total of error values is maintained so that the particular one of the nine different relative locations processed in neighborhood generators 354–362 with the lowest accumulated error weight can be determined. In order to immediately terminate a match attempt for a given library pattern when all nine relative positions of incoming and library patterns have been examined and rejected, the outputs of flip-flops 376–384 are coupled to AND gate 304. If all nine J-K flip-flops are storing a reject (while processing a specific 36×36 pixel pattern), AND gate 304 couples a high level output signal to controller 500 via lead 332 and controller signal bus 501, causing the matching process for that particular library pattern to be immediately terminated. In that event, a new library pattern is selected by screening unit 200, and the matching process is repeated. On the other hand, if at least one of the nine J-K flip-flops is not storing a reject, the matching process continues until the entire 36×36 pixel (nominal) incoming pattern block has been compared with the selected library pattern.

As stated previously, outputs 366-2 through 374-2 from PROMs 366-374, respectively, represent a two-bit weighted error value of from 0 to 3, which is determined in accordance with the error status of the eight pixel scanning block that surrounds the central error pixel (E in FIG. 7) presently being processed. These weights are accumulated in accumulators 386-394 for each selected library pattern, and the accumulator outputs are applied to error weight multiplexer 313. At the end of each operating cycle in which one selected library pattern has been matched against the incoming pattern, the accumulated error weights in accumulators 386-394 are examined to determine which accumulator contains the lowest error weight; this in turn indicates which one of the nine relative positions (used for registration purposes) produced the "best" match.

In order to determine which accumulator contains the lowest value, a control signal (EN1 in FIG. 18) is applied by controller 500 to counter 306 via controller signal bus 501 and lead 563. This signal clears counter 306 and simultaneously presets register 328 to a count of 255, which represents the largest possible accumulated error weight that can reside in accumulators 386-394. In the course of determining which accumulator contains the lowest error weight, it is necessary to consider only those accumulators associated with those of flip-flops 376-384 which do not contain a reject decision. This selection process is accomplished by multiplexer 305, which receives its select input from the data output of counter 306 and its data inputs from flip-flops 376-384. The count maintained in counter 306, available on output line 396, is advanced by $\phi_1$ clock pulses, received by counter 306 from controller 500 via controller signal bus 501 and lead 561. As the count in counter 306 advances, the outputs from flip-flops 376-384 are examined in turn. If any of the flip-flops have a high output indicating a reject decision, the $\overline{Y}$ output of multiplexer 305 on lead 311 goes low, and the error weight in the accumulator associated with that flip-flop is not processed. On the other hand, each low input to multiplexer 305, when selected, produces a high output on lead 311. This high output enables AND gate 326 to pass clock pulses derived from lead 595 to the clock inputs of registers 328 and 333, which are used to store the value of the lowest accumulated error and its position, respectively.

FIG. 18 shows the timing signals used in the best pattern position selection process performed by matcher 300, shown in FIGS. 4 and 5. The sequence begins when counter 306 is initially cleared by a clear signal EN1 applied by controller signal bus 501 via lead 563 and subsequently enabled to count by the enable signal EN2 coupled from controller signal bus 501 via lead 562. Thereafter, a sequence of clock pulses $\phi_1$ is generated by controller 500 and applied via bus 501 and line 561 to the clock input of counter 306. At each occurrence of $\phi_1$, the count in counter 306 advances, and different inputs to multiplexer 305 from the Q outputs of flip-flops 376-384 are selected in turn. For any flip-flop not storing a reject decision, the high $\overline{Y}$ output from multiplexer 305, together with the output of comparator 329 enables AND gate 326 to pass a $\phi_2$ clock pulse on line 595 to the clock inputs of registers 333 and 328.

Concurrent with the operation of multiplexer 305, an error weight multiplexer 313, also responsive to the count in counter 306, is arranged to select its output from among inputs received from error weight accumulators 386-394. The output of multiplexer 313 is applied to the A input of comparator 329 via lead 400. If the applied error weight at input A is lower than the value already stored in register 328, (which is applied to the B input of comparator 329), the comparator output goes high, whereupon AND gate 326 (enabled as set forth above) clocks the applied (lower) error weight into register 328. Simultaneously, the count generated in counter 306, indicating the spatial position corresponding to the accumulated error weight being processed, is entered into a "best position" (BP) register 333. As the select inputs to multiplexers 305 and 313 are advanced, the remaining accumulated error weights (for non-rejected positions) are considered in turn. Each error weight output from multiplexer 313 is compared with the value stored in register 328; if the new weight is lower than the stored weight (and if AND gate 326 is enabled), it replaces the previously stored value. Accordingly, at the end of an operating cycle consisting of nine $\phi_1$ clock pulses, register 328 contains the lowest error weight stored in accumulators 386-394 which are associated with flip-flops 376-384 which do not contain a reject decision. Concurrently, register 333 contains an indication of which of the relative positions (i.e., offset by ±1 pixel in horizontal, vertical and diagonal directions) corresponds to the lowest error weight stored in register 328.

At the end of a successful pattern match, the contents of register 333 is a codeword identifying the relative position of the best match attained by the incoming pattern and selected library pattern. This code must be translated to indicate to coder 800 in absolute terms where the matched library pattern should be located. The vertical or Y position of the pattern is obtained by applying the output of register 333 to position decoding ROM 406, which stores information to indicate whether the library pattern should be moved up one pixel, down one pixel, or remain in the nominal vertical position. A two-bit output from ROM 406, indicating the proper vertical position, is coupled to coder 800 of FIG. 10 via lead 331. In order to determine the horizontal or X position of the pattern, information indicating the horizontal position of the incoming pattern on the present scan line is required. This information is applied to a second position decoding ROM 405 from pattern extractor 101 via lead 401. ROM 405 also receives an input from register 333, indicating the horizontal position of the best match between the incoming pattern and library pattern (e.g., offset left one pixel, offset right one pixel, or in the nominal position). The output of ROM 405 is coupled to coder 800 of FIG. 10 via lead 330. It is to be noted here that absolute horizontal position information is determined from both the incoming pattern position and best match position, while absolute vertical position is determined only from best match position information. This difference occurs because the absolute vertical position of a pattern is identified by coder 800 when processing the facsimile signal on a line-by-line basis.

Library and Library Management

Figure 8:
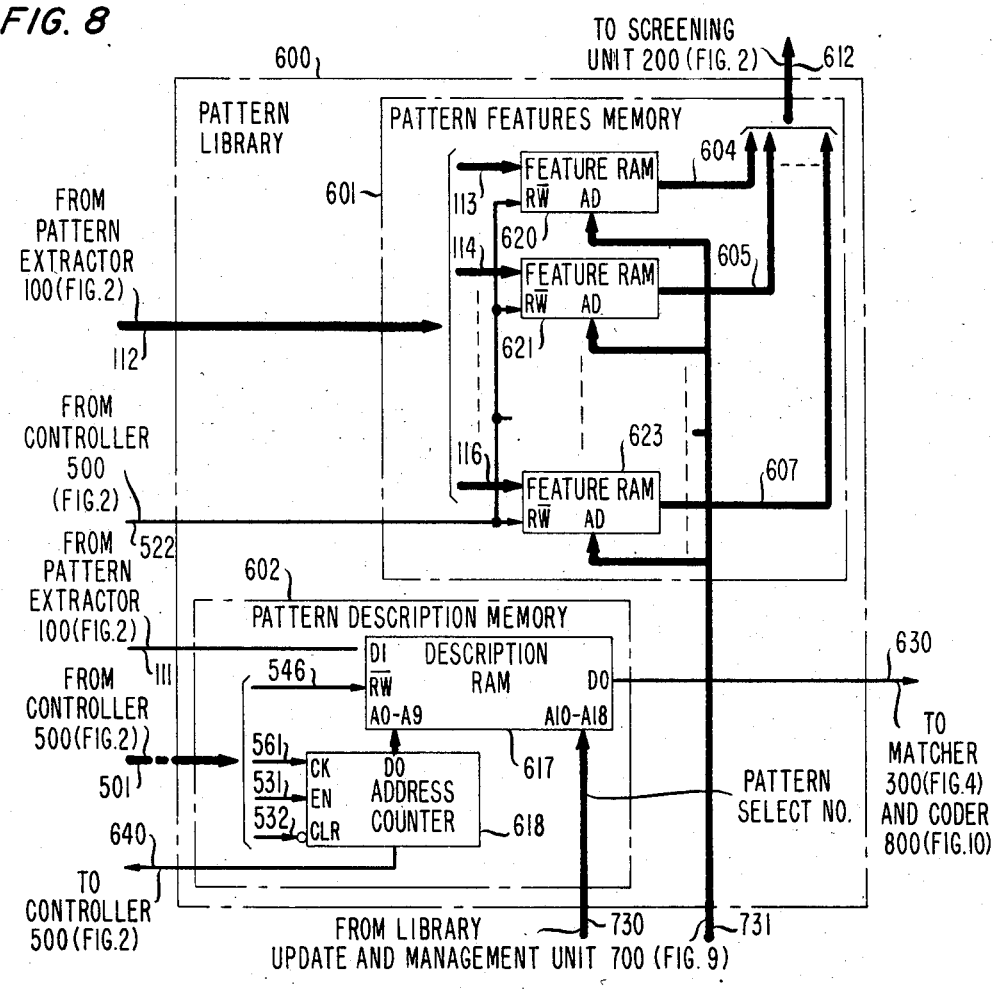
FIG. 8 is a block diagram of pattern library 600 shown in FIGS. 1 and 2.

FIG. 8 is a functional schematic diagram of pattern library 600. This section includes pattern features memory 601 to store library pattern features for comparison with incoming patterns, and pattern description memory 602 to store library pattern descriptions.

Pattern features memory 601, which includes a series of individual feature random access memories (RAMs) 620–623, receives information describing input pattern features from pattern extractor 100 on signal bus 112. Each feature RAM receives information describing pattern features (e.g., pattern length, height and horizontal and vertical white/black run details) via the respective input lead, 113–116. Addresses which determine the proper storage locations for entering and retrieving pattern features are coupled from library update and management unit 700 to feature RAMs 620–623 via signal bus 731.

Read/write control is extended to RAMs 630–623 from controller 500 via control lead 522. In the write mode, features for patterns stored in description RAM 617 (as described below) are entered into RAMs 620–623. In the read mode, features corresponding to selected library patterns are coupled from pattern features memory 601 to screening unit 200 via leads 604 through 607 and signal bus 612.

Pixel-by-pixel descriptions of incoming patterns are extracted by pattern extractor 100 and coupled to pattern description memory 602 via lead 111. These descriptions are entered into pattern description RAM 617, which advantageously has a capacity large enough to store 512 patterns, each containing 32×32 or 1,024 pixels. The patterns are stored in pixel-map form, such that the specific locations of the 1,024 pixels in each pattern are preserved. The read/write status of RAM 617 is controlled by an input from controller 500 on lead 546. In the read mode, a codeword identifying the selected library pattern is coupled from library update and management unit 700 to address leads A10–A18 via bus 730. For any selected pattern, the 1,024 pixels are then conveniently coupled from RAM 617 to matcher 300 and coder 800 via signal bus 630, under control of an address counter 618 connected to address leads A0–A9. Similarly, in the write mode, pattern description pixels are entered into RAM 617 under the joint control of addresses generated by address counter 618 and a codeword supplied via bus 730. Address counter 618 receives clock (CK), enable (EN) and clear (CLR) inputs from leads 561, 531 and 532, respectively. These inputs are generated in controller 500 and applied via controller signal bus 501. As stated previously, the outputs of counter 618 supply addresses A0 through A9 of RAM 617, which represent the addresses for the 1,024 pattern description pixels stored (or to be stored) in description RAM 617. Addresses A10–A18 represent the particular one of the 512 patterns to be retrieved (in the read mode) or its storage location (write mode). An output from address counter 618 is also extended to controller 500 via lead 640. This signal, called "end of pattern signal", indicates that 1,024 pixels have been loaded into description RAM 617.

As explained previously, it is desirable to create a two-pixel wide border of white pixels around each nominal 32×32 pixel pattern block. This border can be created by lowering the count enable signal 531 to counter 618 and therefore stopping the count at the appropriate times and inserting the required logical zero's at appropriate locations in the incoming and library pattern bit stream.

Figure 9:
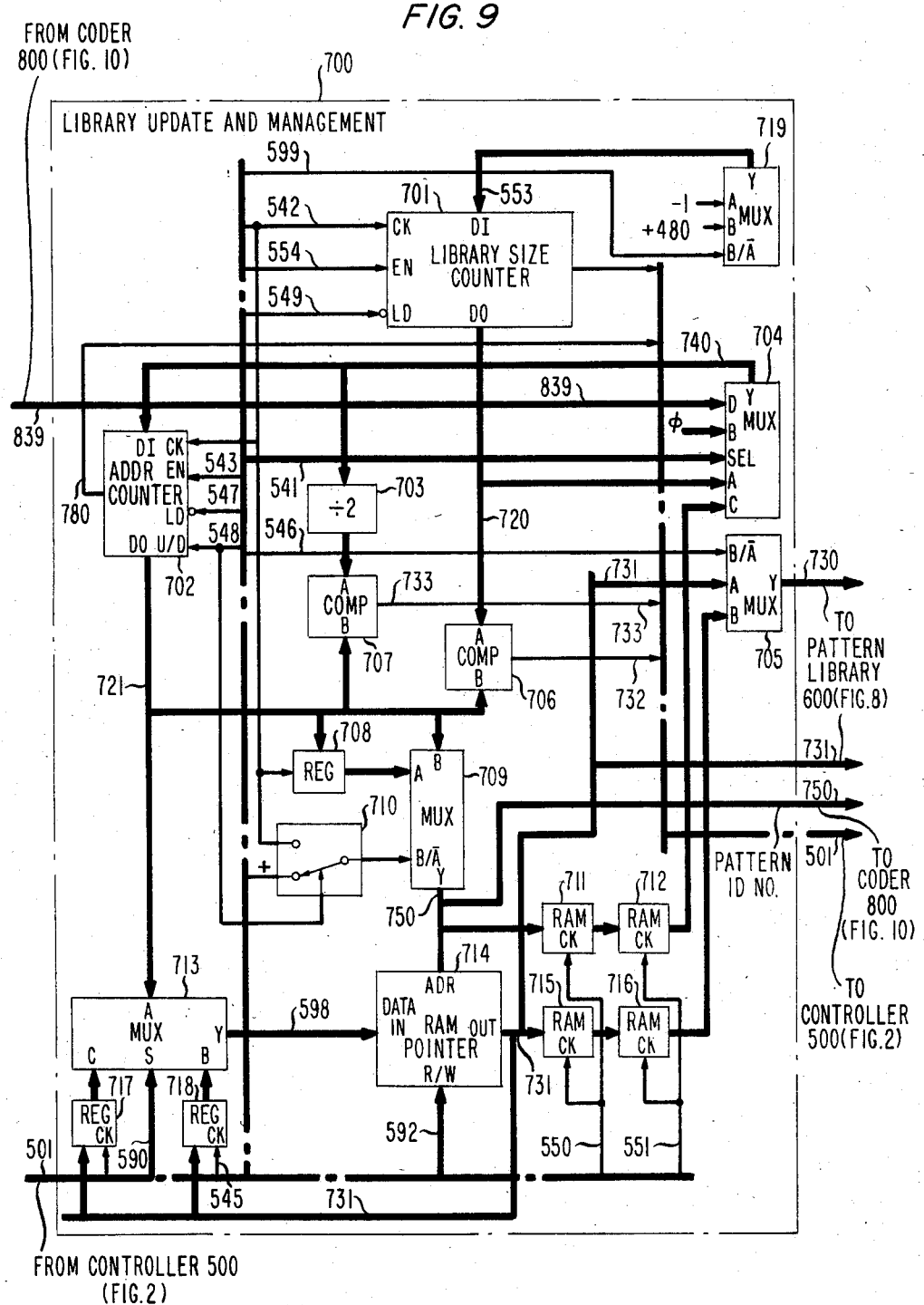
FIG. 9 is a block diagram of library update and management unit 700 shown in FIGS. 1 and 2.

FIG. 9 is a block diagram of library update and management unit 700, which adds new pattern descriptions to description RAM 617, organizes the pattern identification numbers for the most efficient match (advantageously by assigning low identification numbers to frequently used patterns) and deletes infrequently used patterns. FIG. 19 shows the control signals associated with different operational phases of unit 700, including initialization, new library pattern storage, feature screening and shuffling of pattern select numbers by frequency of occurrence.

RAM pointer 714, which lies at the heart of unit 700, is used to provide indirect addressing of pattern features and descriptions stored in pattern library 600. RAM pointer 714 includes as many memory locations as there are patterns in library 600, typically 512. The addresses for the storage locations are referred to as pattern identification numbers, while the contents of each location is referred to as pattern selection numbers, which identify patterns and features stored in library 600. RAM pointer 714 operates in a read or write mode, depending upon the status of an input received on line 592. In its write mode, data applied on line 598 is stored in the address supplied by line 750. In the read mode, stored information at the specified address (line 750) is output on bus 731.

Library update and management unit 700 circuitry must be initialized before receiving the first library pattern. This process ensures that RAM pointer 714 is initialized with pattern select numbers stored in its memory locations that correspond to the pattern identification numbers applied to the address (ADR) lead. With reference to FIGS. 9 and 19, initialization includes setting library size counter 701 to a −1 count, which is accomplished by (a) coupling a clock signal from controller signal bus 501 to the clock input of counter 701 via lead 542, and (b) applying a −1 at the data input to counter 701 on line 553 while a low level load signal is applied to counter 701 via line 549 from controller signal bus 501. The data input to counter 701 is derived from the Y output of multiplexer 719, which selects its A input (−1) under control of a signal on line 599 from controller signal bus 501.

During initialization, a zero is loaded into address counter 702. This is accomplished by coupling the appropriate two-bit code from controller signal bus 501 to the select input of multiplexer 704 via bus 541, which selects the B input (a zero) of multiplexer 704 as the multiplexer output. This output is coupled from the Y output of multiplexer 704 to the DI input of address counter 702 via line 740. The zero input is loaded into counter 702 when the clock input on lead 542, and the up/down (U/D) input on lead 548, all applied via controller signal bus 501, are high and the load input on lead 547 is low. Also during initialization, a zero is written into RAM pointer 714. This sequence is initiated when a high level signal from controller signal bus 501 is applied to lead 548, positioning switch 710 as shown in FIG. 9 so as to select the B input of multiplexer 709. This B input is derived from the data output (line 721) of counter 702, which is thus coupled through multiplexer 709 to the address input of RAM pointer 714 on line 750. Concurrently, the appropriate two-bit code from controller signal bus 501 is applied to bus 590 to select the A input of multiplexer 713. As a result, the data output from address counter 702 on lead 721 is also coupled through multiplexer 713 to the data input lead 598 of RAM pointer 714. Also, a write control signal is applied to RAM pointer 714 via lead 592, so that a zero is written in RAM pointer 714 at location zero. As the count in counter 702 advances, its output is written into RAM pointer 714 until address 511 is reached. Accordingly, at this point of the initialization process, pattern select numbers stored in RAM pointer 714 start with memory location zero and continue with memory locations 1 through 511.

The next operational phase performed by library update and management unit 700 involves the entry of new library patterns in pattern library 600. When the first library pattern description is loaded into description RAM 617, control signals from controller 500 are coupled to the various functional elements in library update and management unit 700 via controller signal bus 501. In particular, the control signals applied to library size counter 701 via clock and enable inputs 542 and 554, increment the counter (previously initialized to −1) to 0. Library size counter 701 thereafter keeps track of the 512 library patterns, insuring that new pattern identification numbers follow the last previously assigned number. The appropriate control signal levels needed to accomplish storage of new patterns as just described are shown in FIG. 19.

The output from RAM pointer 714 is applied via signal bus 731 to registers 715, 717 and 718. The same output is also coupled to pattern features memory 601 via signal bus 731, multiplexer 705 and bus 730, in order to allow the first pattern to be stored in location zero of description RAM 617. In order to select the A input of multiplexer 705, a logical zero from controller signal bus 501 is generated via lead 546. As counter 618 is thereafter incremented, description information for the first pattern is stored in pattern description RAM 617 with corresponding addresses 0 through 1023. Concurrently, the output from RAM pointer 714 on bus 731 is applied to the address input of all feature RAMs 620-623 in pattern features memory 601 of FIG. 6. As a result, the features of the pattern just stored in RAM 617 are entered into the corresponding address locations of RAMs 620-623.

During the remainder of the new library pattern storage process, the count in library size counter 701 is incremented for each new pattern. The output of counter 701 is passed through multiplexer 704, also incrementing the count in counter 702 when it is loaded by making line 547 low. As a result, the output of RAM pointer 714 is also incremented, since the output of counter 702 is coupled to the input of RAM pointer 714 via multiplexer 713. This causes the next and succeeding patterns, and their associated features, to be stored in the next available locations in pattern description memory 602 and pattern features memory 601, respectively. As mentioned previously, the pixel-by-pixel information describing each stored pattern is stored in RAM 617 as address counter 618 counts from 0 to 1023. Accordingly, description information for the second pattern is stored in RAM 617 at addresses of 1024 through 2047, and the $n^{th}$ successive pattern description information is stored at the 1024 address beginning at address 1024(n−1).

During the library pattern storage process just described, the output from multiplexer 709, representing pattern identification numbers, is coupled to coder 800 (described below) via lead 750. When the end of the scan line is detected by pattern storage memory 801, library update and management unit 700 next performs a process referred to as "shuffling" or updating, in which the pattern select numbers associated with stored patterns are rearranged. This process has two advantages: frequently used patterns have lower pattern identification numbers, enabling more efficient coding, and frequently used library patterns can be selected for matching sooner in each match cycle, speeding up the overall time to encode a given facsimile. The updating rules for patterns stored in pattern library 600 can be defined as follows:

(a) When a library pattern matches an incoming pattern, the pattern select number located at address K in RAM pointer 714 is moved to address K/2, and pattern select numbers located at K/2 through K−1 are moved to (K/2)+1 through K; and (b) When a new pattern is added to the pattern library, its pattern select number is placed at address N/2 in RAM pointer 714, where N is the total number of library patterns minus one. Library pattern select numbers located at N/2 through N−1 are moved to (N/2)+1 through N.

This pattern updating procedure effectively organizes the pattern select numbers contained in RAM pointer 714 for the most efficient pattern matching sequence so that more frequently occurring pattern select numbers are moved closer to address zero and less frequently occurring pattern select numbers are increased. For example, if a match occurs between the incoming pattern and the library pattern with identification number 15, an indirect addressing scheme that uses a pattern select number corresponding to pattern identification number 15 will move the pattern select number at location 15 closer to address zero. Thus, an attempted pattern match using this pattern select number will occur much sooner, statistically reducing the pattern matching time.

The shuffling process begins when pattern identification numbers representing matched patterns on the just processed scan line are coupled to the D input of multiplexer 704 via signal bus 839. During this process, the D input of multiplexer 704 is selected by a select signal applied by controller 500 via bus 541, and the addresses appearing at the Y output of multiplexer 704 are coupled to the DI input of address counter 702. Each address is entered in counter 702 by a clock signal on lead 542 and a load signal (low) on lead 547. Accordingly, address counter 702 is now loaded with the address of the pattern select number to be placed at N/2 position. Input B of multiplexer 709 is selected and register 717 is loaded with the pattern select number stored at location N in RAM pointer 714. Next, the pattern select number located at N−1 is moved to N location and the pattern select number located at N−2 is moved to N−1. location. This shuffling process continues until the pattern select number located at N/2 is moved to location N/2+1, whereupon the sequence is completed. The control signal levels necessary for the pattern select number shuffling are shown in FIG. 1. A detailed description of the pattern updating process is described below.

During the shuffling process, a control signal generated by controller 500 is extended to switch 710 on line 548, repositioning that switch so that the select input of multiplexer 709 is received via line 542. With this arrangement, the B input of multiplexer 709 is selected during the first half of each complete clock signal cycle on line 542, and A input is selected during the second half of each clock cycle. During each clock cycle, the contents of address counter 702 are decremented by one. For example, after address counter 702 receives a signal at its data input (DI) representing a count of N, when an enable (EN) signal is thereafter applied to lead 543 and a control signal is applied to U/D lead 548, counter 702 will generate a signal at its data output (DO) representing a count of N−1. This output is coupled via line 721 to register 708 and the B input of multiplexer 709. During the portion of the clock cycle in which the signal on line 542 is high, the B input of multiplexer 709 is coupled to the address (ADR) input of RAM pointer 714. Also, the word stored in location N−1 of RAM pointer 714 is loaded into register 718 via signal bus 731. During the second half of the clock cycle when the signal on line 542 is low, the contents of register 708 are coupled from the A input of multiplexer 709 to the ADR input of RAM pointer 714. Next, a select signal applied to multiplexer 713 via bus 590 causes the contents of register 718 to be coupled to RAM pointer 714 for storage. This process thus effectively moves the pattern select number stored at location N−1 to location N.

During the next clock signal cycle, the shuffling process continues, and the pattern select number in location N−2 is moved to location N−1; this sequence continues until the output from address counter 702 is equal to N/2. This equality condition is determined by divide-by-two element 703 and comparator 707. In particular, when the output from address counter 702 applied to the B input of comparator 707 indicates a value of N/2 and a corresponding output from divide-by-two element 703 is applied to the A input of comparator 707, the output of the comparator goes high. The resultant high level signal appearing on lead 733 is coupled to controller 500 via controller signal bus 501. After receiving this high level signal, controller 500 returns a control signal on bus 590 to select the C input of multiplexer 713. This selection allows the output of register 717 to be coupled from the Y output of multiplexer 713 to RAM pointer 714 for storage at memory location N/2. This described process is repeated until pattern updating for each line is completed.

The output of RAM pointer 714 is also coupled to pattern library 600 via signal bus 731, to supply addresses for pattern features stored in feature RAMs 620–623. Similarly, the output of RAM pointer 714 is applied to the A input of multiplexer 705; when the A input is selected by a control signal on line 546, the Y output of multiplexer 705 is extended to pattern library 600 on lead 730. This output supplies the address select numbers for pattern descriptions stored in description RAM 617.

During a feature screening cycle, the features of a pattern received from pattern extractor 100 are compared with the features of the stored library patterns. For this operation, address counter 702 is first cleared and the B input of multiplexer 709 is selected by application of a control signal on line 548. As the count in counter 702 thereafter advances, the output of RAM pointer 714, representing the pattern select addresses of the stored patterns in order of frequency of occurrence, is sent to pattern features memory 601, thus selecting a set of features to be compared with the features of the incoming pattern. If the features match, registers 715 and 711 are loaded (as explained below) and controller 500 is notified of the match. Otherwise, address counter 702 is incremented and another set of features are compared. This process continues until either a match is found or the end of the library is reached. This is indicated by a high output from comparator 706 indicating that the count in counter 702 is equal to the count in counter 701.

When a match is found, the library update and management unit of FIG. 9 stores the pattern select number in register 715 and its position (address) within RAM pointer 714 in register 711. Unit 700 then waits for an acknowledgement from controller 500 whereupon the information in registers 715 and 711 is clocked into registers 716 and 712, respectively. After these registers have been loaded, the output of register 716 is sent to pattern library 600 via multiplexer 705 where the appropriate pattern is selected for a pixel-by-pixel match with the incoming pattern. When the pattern feature comparison cycle is completed, the pattern identification number is coupled from register 712 to the C input of multiplexer 704. A control signal applied to bus 541 couples the Y output of multiplexer 704 to the DI lead of address counter 702.

When address counter 702 reaches the count of 511, the storage limit of RAM pointer 714 has been reached, and a signal indicating this condition is coupled to controller 500 via lead 780, inhibiting further counting. Also, when library size counter 701 exceeds an arbitrarily determined count of 480, a signal (designated LE for library end) is coupled to controller 500 via controller signal bus 501. If the LE signal is high at the end of a line, controller 500 couples a control signal to the select lead of multiplexer 719, selecting its B input. This action loads the count of 480 into library size counter 701, effectively deleting library pattern identification numbers greater than 480. Therefore, up to 32 new library patterns can be added to pattern library 600 while processing the next scan line.

If the pattern library contains less than 511 patterns, comparator 706 prevents the count in address counter 702 from exceeding the count in counter 701. Thus, if only 100 patterns are stored in the pattern library, counter 702 will only count to 100. Comparator 706 receives its A input from address counter 702 and its B input from library size counter 701; when equality is detected, a high level output signal on lead 732 is coupled to controller 500 via controller signal bus 501.

Coder

Figure 10:
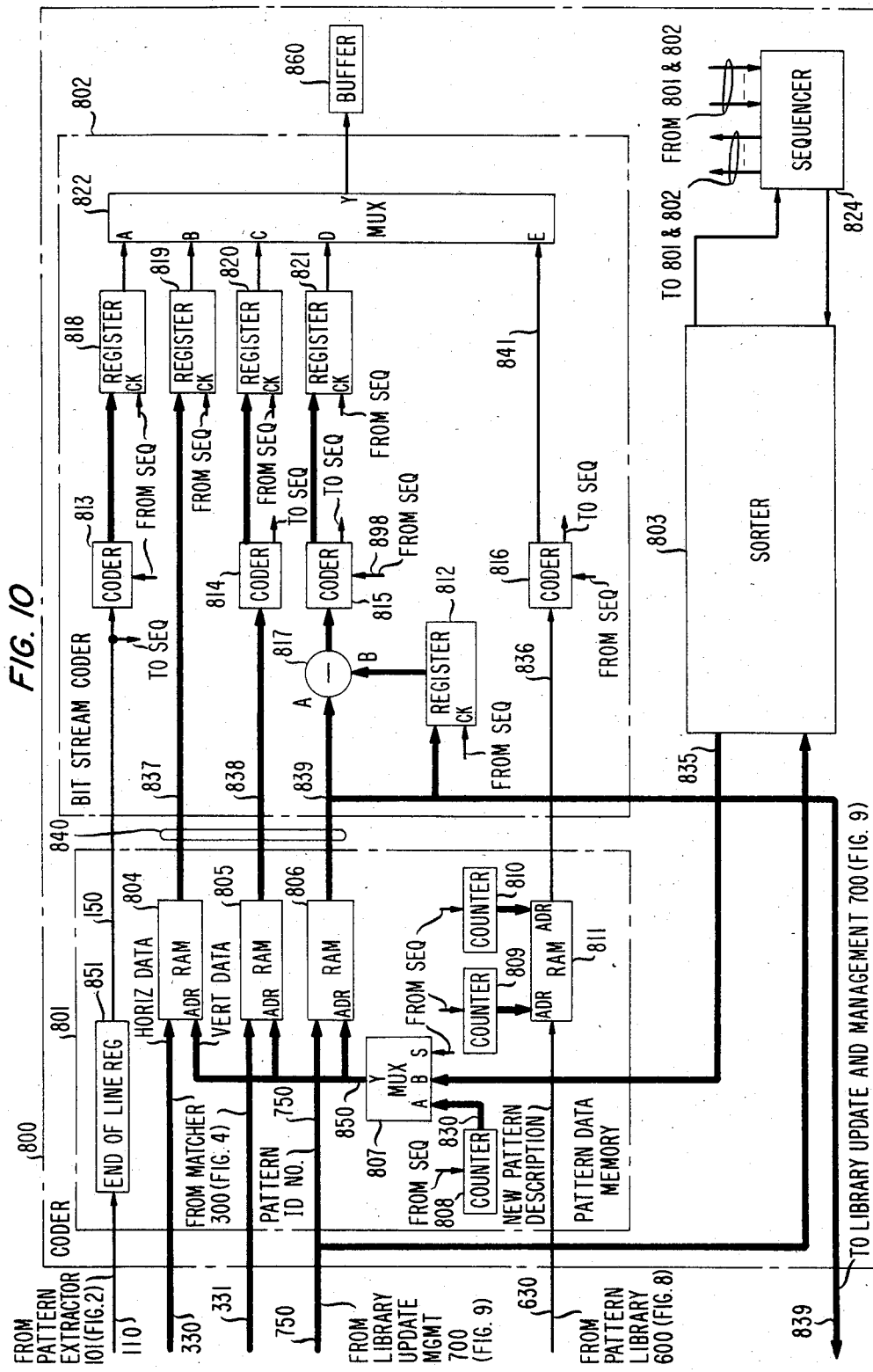
FIG. 10 is a block diagram of coder 800 shown in FIGS. 1 and 2.

FIG. 10 is a block diagram of coder 800, which stores, sorts and codes pattern position data as well as library and new pattern information, if any. This information is stored in pattern data memory 801, until pattern ID numbers are sorted at the end of each scan line by sorter 803. Thereafter, the information is coded by bit stream coder 802 and stored in buffer 860 before transmission. The overall operation of coder 800 is controlled by sequencer 824, which provides timing signals to pattern storage memory 801, bit stream coder 802 and sorter 803.

Incoming patterns isolated on each scan line are matched with library patterns in matcher 300, and the resulting information (horizontal and vertical position data, library pattern identification number and new pattern description data, if any) is stored in pattern storage memory 801. In particular, horizontal position data is coupled from matcher 300 to RAM 804 via lead 330; vertical position data is coupled from matcher 300 to RAM 805 via lead 331; and the pattern identification number is coupled from library update and management unit 700 to RAM 806 via lead 750. New pattern descriptions are coupled from pattern library 600 to RAM 811 via bus 630. Addresses for data stored in RAM 811 are generated by counters 809 and 810, ensuring that successive new patterns on each line are stored in RAM 811 with successive addresses; counter 809 advances once for each new pattern on the line, while counter 810 then advances 1024 times to store pixel by pixel data in RAM 811.

At the end of each scan line, an "end-of-line" signal is coupled from pattern isolator 101 to end-of-line register 851 via lead 110. The output from end-of-line register 851 on lead 150 activates sequencer 824, which in turn, activates bit stream coder 802 and sorter 803 as described below.

Sorter 803, advantageously containing a microprocessor and associated circuitry, sorts the ID numbers in increasing order. Sorter 803 generates a sequence of addresses which are applied to RAM 806 to generate a sequence of stored ID numbers in increasing order. These addresses are coupled to the B input of multiplexer 807 via lead 835, and the Y output of multiplexer 807 is coupled to the address inputs of RAMs 804–806 via lead 850. If the A input of multiplexer 807 is selected by coupling the appropriate select signal generated by sequencer 824 to the multiplexer select lead, addresses on line 830 are instead coupled from counter 808 to RAMs 804–806 via lead 850; this condition occurs when information is initially received from matcher 300 and library update and arrangement unit 700 before sorting begins.

In bit stream coder 802, end-of-line data is coded by coder 813 and stored in register 818. Then, horizontal position data is coupled from RAM 804 to register 819 for storage in an uncoded format. This approach is taken for two reasons: first, it has been determined that variable length coding of the relatively long distance between patterns yields only slightly smaller coding lengths (typically one to one and one-half bits per pattern) than in the uncoded case. Second, absolute addressing allows transmission of patterns on a scan line in any order, as is necessary after sorting of library ID numbers. Vertical position data is coded by coder 814 and stored in register 820.

Pattern identification numbers are coupled from RAM 806 to both register 812 and subtractor 817 via bus 839, so that the difference between successive ID numbers output from subtractor 817 is then coded by coder 815 and coupled to register 821 for storage. This is done so that the sequence of pattern identification numbers can be differentially coded such that only the increase of each number compared to the previous identification number is transmitted. Coder 815 receives an input from sequencer 824 on line 898 and, like coders 814 and 816, supplies an output to sequencer 824 for timing purposes. Coder 815 also generates a new pattern code when the received pattern ID is larger than an internally stored value; this code is explained below.

The operation of coder 815 may be illustrated in an example in which a scan line is assumed to contain a sequence of patterns represented by pattern identification number 23, a new pattern, pattern identification number 28, pattern identification number 28, pattern identification number 23 and a new pattern. As shown in Table 1 above, this sequence could be coded as (0100110) (00100) (0101011) (000) (0100110) (00100) which has a length of 34 bits. If the same sequence is first sorted, the resulting sequence includes pattern identification number 23, same, pattern identification number 28, same, a new pattern and another new pattern. The coding according to Table 1 is (0100110) (000) (10101) (000) (00100) having a length of 23 bits. Notice that pattern identification number 28 receives the code for pattern 5, since only the increase compared to the previous identification number is coded. Notice also that no identification is sent for the second new library pattern since it is known that if there are any more patterns after the first new pattern, they must also be new patterns. Therefore, a reduction of eleven bits is realized through an efficient sorting and coding technique described in this example.

New pattern descriptions coupled to coder 816 from RAM 811 via lead 836 can be coded in numerous ways well known to those skilled in the art including the CCITT modified READ code described in more detail in the referenced paper by Hunter and Robinson.

Clock signals generated by sequencer 824 clock data in and out of registers 818–821. At this point, end-of-line data in register 819, vertical position data in register 820, and library identification numbers in register 821 are coupled to multiplexer 822. Multiplexer 822 multiplexes the previously described data along with new pattern data on lead 841, and couples the data output to buffer 860. Data remains in buffer 860 until it is transmitted via a transmission medium to a receiver or other final destination.

FIG. 20 is a flowchart illustrating the process used in accordance with the present invention for storage of pattern information in coder 800. This process is initialized by clearing counters 808 and 809, and selecting input A of multiplexer 807. In step 2001, the output from pattern extractor 100 is then coupled to end of line register 851 via lead 110. If an end of line signal is not detected in test step 2002, horizontal position data from matcher 300 is coupled to RAM 804 via lead 330; vertical position data from matcher 300 is coupled to RAM 805 via lead 331; and library identification numbers from library update and management unit 700 are coupled to RAM 806 and sorter 803 via lead 750 in step 2003. The output from counter 808, appearing at the Y output of multiplexer 807, is used to clock horizontal position data, vertical position data and pattern identification numbers into RAMs 804, 805 and 806, respectively. If the "end of line" signal is present on lead 110, a test 2008 determines if any library patterns are on the scan line. If so, coder 813 generates a "patterns on line" codeword in step 2010. This codeword initiates the pattern sorting sequence described below. If the "end of line" signal is present on lead 110 but no library patterns are on the scan line, coder 813 generates a "no patterns on line" codeword in step 2009. This codeword along with an "end of page" message terminate the coding sequence.

When a new library pattern is indicated in test step 2004, new pattern data, consisting of 1024 pixels, is coupled from pattern library 600 to RAM 811 via lead 630 in step 2005. Counters 808 and 809 are then incremented in steps 2007 and 2006, respectively. If a new library pattern is not indicated in test step 2004, only counter 808 is incremented.

Figure 22:
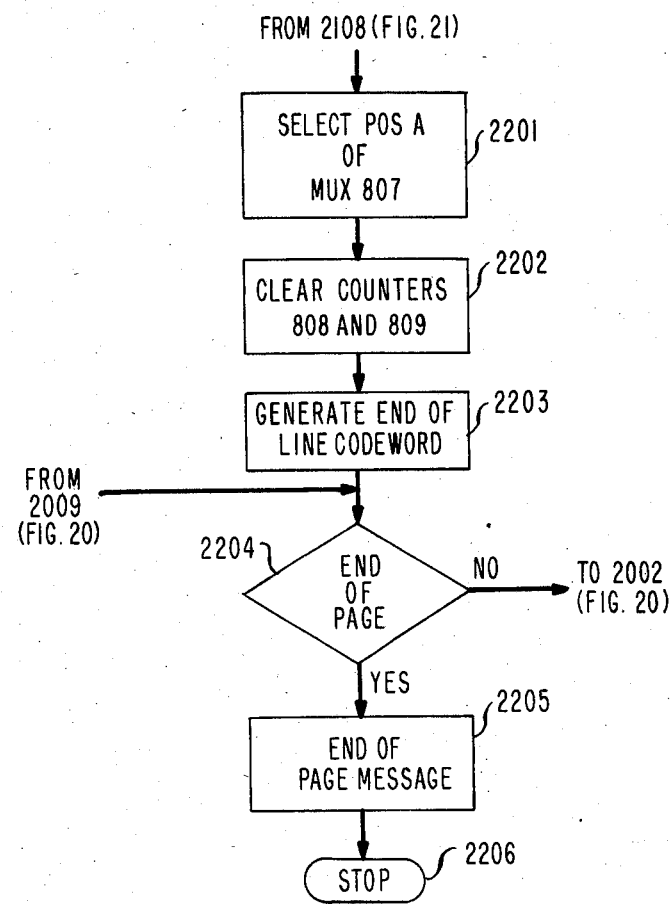

FIGS. 21 and 22 are a flowchart illustrating the process used in coding of pattern information in coder 800. This process is initialized by clearing counters 808 and 809, clearing register 812, setting sorter 803 to N=1, and selecting position B of multiplexer 807. If the end of line signal is present on lead 110 and library patterns are on the scan line, a control signal is coupled from sequencer 824 to sorter 803 to initiate the pattern sorting sequence. If no library patterns are on the scan line and an "end of line" message is present, pattern processing for that line is terminated. In step 2101, sorter 803 sorts the stored library identification numbers in increasing number order and the respective outputs of sorter 803, appearing at the Y output of multiplexer 807, are used in step 2102 to read out the contents of RAM 806 in increasing order and to read out the corresponding contents of RAMs 804 and 805.

In step 2103, the output from RAM 804 is clocked into register 819 via lead 837, the output from RAM 805 on lead 838 is coded by coder 814 and clocked into register 820, and the output from RAM 806 is coupled to subtractor 817, register 812 and library update and management unit 700 via bus 839. The difference output from subtractor 817 is also coded by coder 815 and clocked into register 821. This arrangement is necessary to run length code the library pattern identification numbers (i.e., only the increase compared to the previous identification number is coded). Library update and management unit 700 processes the input on bus 839 so that frequently occurring pattern identification numbers are assigned low pattern select numbers.

In step 2104, horizontal data stored in register 819 is clocked into buffer 860 via the B input and Y output of multiplexer 822. If a new library pattern is indicated in test step 2105 and it is the first pattern on the scan line (test step 2110), a "new pattern" codeword is generated by coder 815 in step 2113. This codeword is coupled to buffer 860 via register 821 and the D input and Y output of multiplexer 822. Then, new library pattern descriptions are coupled to coder 816 via lead 836 in step 2111. This is accomplished by changing RAM 811 from the write to read mode and by incrementing counter 810 from a count of 0 to 1023, thus supplying data describing the 1024 pixels in the pattern to coder 816. The coded data from coder 816 is next coupled in step 2112 to buffer 860 via lead 841 and the E input and Y output of multiplexer 822. At the end of this operation, counter 809 is incremented. Note that vertical position information is not encoded for new library patterns. If test step 2108 determines that there are more new patterns to be coded, the value of N is incremented in step 2109 and the coding process just described is repeated. If a "new pattern" codeword is not generated by coder 815 (test step 2105), library identification numbers stored in register 821 are clocked into buffer 860 via the D input and Y output of multiplexer 822 in step 2106. Next, in step 2107, vertical data stored in register 820 is clocked into buffer 860 via the C input and Y output of multiplexer 822. If there are more library patterns to be coded, this coding sequence continues; if there are no more library patterns to be coded, the coding sequence is terminated as described below.

Referring now to FIG. 22, after all patterns have been coded, position A of multiplexer 807 is selected in step 2201 and counters 808 and 809 are cleared in step 2202. When the "end of line" codeword (2203) is followed by detection of an "end of page" signal in step 2204, an end of page message is generated in step 2205 and the coding sequence for that frame is completed in step 2206. If an "end of page" signal does not follow the "end of line" codeword, the pattern storing or sorting/coding process of FIG. 20 continues.

The foregoing coding procedure can be summarized as follows:

(a) Incoming patterns isolated on each scan line are matched with library patterns and the resulting information (horizontal and vertical position data; library pattern identification number; and new pattern data, if any) is stored in pattern storage memory 801.

(b) At the end of the scan line: (1) the pattern identification numbers are sorted in order of increasing number by sorter 803 and (2) new pattern descriptions are added to the end of the library pattern identification number listing in sequential order by pattern storage memory 801.

(c) Pattern information is formatted and coded by bit stream coder 802, illustratively in the following order: (1) uncoded horizontal position data, (2) coded library pattern identification number, and (3) coded vertical position data. If the incoming pattern is a new pattern, its description and horizontal position are encoded, but its vertical position is skipped.

(d) After all pattern information for a particular line is transmitted, a codeword is sent to indicate the end of the line.

(e) Frequently occurring patterns are moved closer to address zero in library update and management unit 700.

(f) After the updating sequence is completed, library patterns with an identification number greater than 480 are deleted. Therefore, at most 32 new library patterns can be added on the next scan line.

While various techniques are known for encoding new pattern descriptions, encoder 816 is illustratively arranged to format this information to include: (i) a header bit indicating whether the horizontal or vertical code mode (explained below) is selected, (ii) a five-bit word indicating the pattern size and (iii) a series of variable length words describing the library pattern bit map using the CCITT 2-D coding scheme. The header bit is chosen to indicate one of two possible modes for coding pattern descriptions, called horizontal and vertical coding. In horizontal coding, the rows of pixels in a pattern are coded sequentially, while in vertical coding, the pattern is coded column by column, top to bottom. In either mode, the pattern description also includes a five-bit word indicating pattern height (in the horizontal mode) or width (in the vertical mode). The other dimension is always 32.

Table 2 summarizes the information assembled in multiplexer 822 by coders 813–816 within bit stream coder 802.

TABLE 2

Codeword Descriptions for Bit Stream Coder 802

| Code Definition | Word Size | Description |
| --- | --- | --- |
| Horizontal position | 11 | Identifies the horizontal position of a pattern (if page width ≦ 1792 pixels). |
| Vertical move of pattern | 1 or 2 | Indicates whether the pattern must be moved up or down by one line or is not moved at all as compared to nominal position established by current scan line. |
| Library identification | variable | Identifies which library pattern is transmitted; differential with respect to previous ID |
| Header bit | 1 | Indicates whether the |

TABLE 2-continued

Codeword Descriptions for Bit Stream Coder 802

| Code Definition | Word Size | Description |
| --- | --- | --- |
| | | horizontal or vertical coding mode is selected. |
| Library pattern size | 5 | Indicates the number of lines to be added to the library. |
| Library pattern description | variable | Indicates the on/off status of individual pixels in a pattern. |
| No more patterns | 3 | Indicates that there are no more patterns on the current scan line. |

In Table 2, the header bit indicates whether the horizontal or vertical coding mode is selected. A logical one is used for horizontal mode and logical zero for vertical mode. The horizontal position codeword identifies the horizontal position of a pattern on the current scan line. The "no more patterns codeword" is a special horizontal position codeword, which indicates that there are no more patterns on the line. Vertical move of pattern indicates the vertical shift of a matched pattern from its nominal position. The library identification number defines which library pattern matched the incoming pattern; this value is coded differentially, as described above. The library pattern size indicates the number of lines in the pattern to be coded. The library pattern description indicates the on/off (black/white) state of individual pixels in a pattern.

As mentioned above, the modified READ code, which may be used to code library pattern descriptions, employs a line-by-line processing technique to identify the position of each transition pixel (i.e., a pixel whose value differs from previous value) with reference to a previously processed transition pixel which may be on the previous line or on the same line, as described in the Hunter and Robinson reference. After each line is coded, it becomes the reference line for the subsequently coded line.

Figure 15:
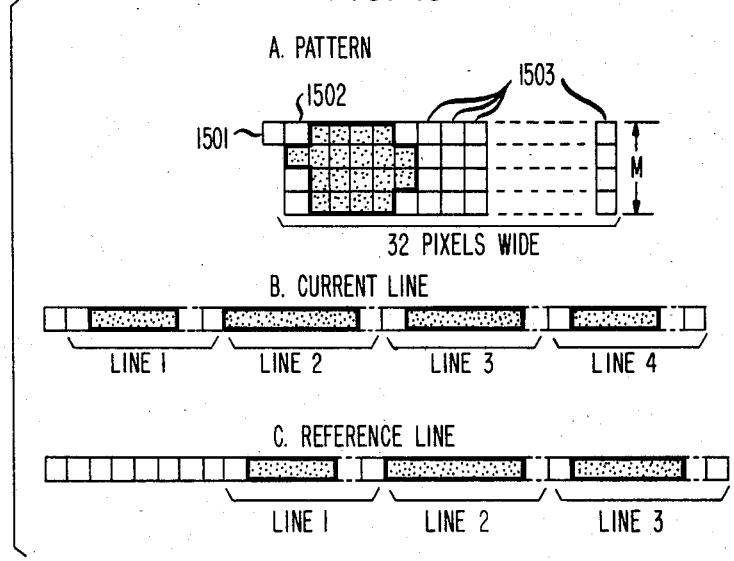
FIG. 15 illustrates the pattern description coding principle used in coder 800 of the present invention.

FIG. 15 illustrates the CCITT 2D coding technique with which library pattern descriptions may be encoded. Advantageously, coding efficiency is improved by first adding a white pixel 1501 ahead of the first pixel 1502 in the pattern and extending the original pattern width to 32 by adding the required number of white pixels (e.g., pixels 1503) to each pattern line. The pattern, as shown in FIG. 15, is thus 32 pixels wide and M lines long. To code the pattern, two lines, each 32×M pixels long, are considered: one line is the current line (B) and the other one is the reference line (C). The current line is formed sequentially from the M lines in the pattern, while the reference line is formed similarly, except that it is shifted by one line width, i.e., 32 pixels. Transitions in the black/white status of pixels on the current line are next located as compared to corresponding transitions on the reference line. If the transitions fall within a prescribed distance, that distance is encoded. Otherwise, the transitions on the current line are coded with respect to previous transition on the same line.

Figure 16:
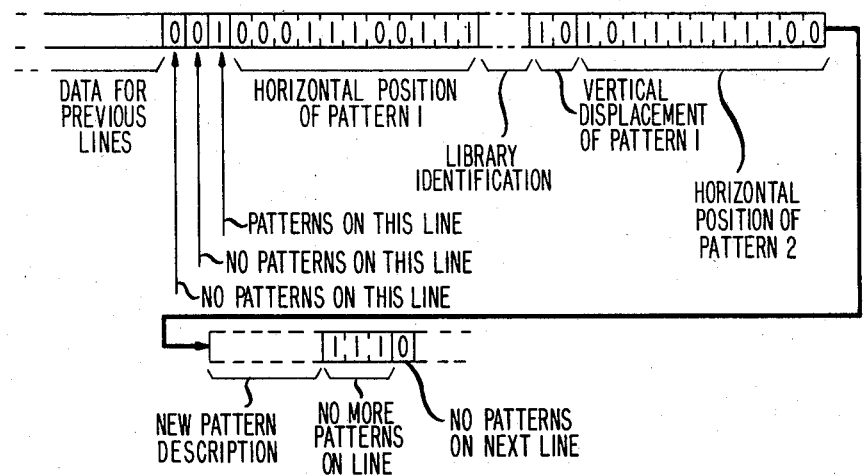
FIG. 16 illustrates an example of the output of coder 800, indicating the technique used for pattern position coding.

FIG. 16 illustrates pattern position coding performed in coder 802. If, for example, two lines have no patterns and the next line has two patterns, the first two lines each are coded as a single (0) bit. A single (1) bit next indicates that patterns exist on the next line. The horizontal position of the first pattern (position 231) is identified, and the pattern itself identified by a library identification number. Finally, the vertical displacement of the first pattern is encoded. The second pattern position is next coded (position 1532). If this is a new pattern, its description is next coded. The final (111) bits indicate that there are no patterns on the next line.

FIG. 17 illustrates another example of the manner in which several lines of a facsimile are encoded for transmission in accordance with the present invention. In the example illustrated, the first two scan lines have no patterns but the next line contains six patterns, as indicated in the following table:

TABLE 3

| Position on Scan Line | Pattern Identification Number |
| --- | --- |
| 249 | New |
| 416 | 28 |
| 936 | 23 |
| 998 | New |
| 1231 | 28 |
| 1436 | 23 |

As seen in FIG. 17, the first two lines are each coded with a single bit (0) to indicate the absence of patterns on those lines. A one-bit code (1) then indicates that patterns are present on the succeeding line. Since coder 800 sorts the patterns on a given scan line in accordance with the library identification numbers, the first pattern to be encoded has library ID #23. Accordingly, the horizontal position of the first pattern (936) is followed by a code word indicating that identification number followed by a two-bit code word indicating the vertical movement, if any, of the pattern from its nominal position. The second pattern to be coded has the same pattern ID number (23). Accordingly, its horizontal position (1436) is next encoded followed by a three-bit code word (000) indicating that its ID number is the same (23) as the previous pattern. The next bit (0) indicates the vertical movement of that pattern from its nominal position. The next larger pattern identification number is pattern ID 28 and the horizontal position of the first such pattern (416) is next encoded. The pattern ID number for this pattern is encoded as a "5" rather than as pattern ID 28, since the difference between the current pattern (28) and the previous pattern ID (23) is "5". A codeword indicating a vertical movement of this pattern from its nominal position follows. The fourth pattern is again the same and is encoded in a manner similar to that described above with respect to the second pattern. The fifth and sixth patterns are new and do not match any patterns in the library. The horizontal position (249) of the first new pattern is first encoded, followed by a five-bit codeword indicating that a new pattern description follows. This description itself has three parts. First, a one-bit pattern header indicating whether horizontal or vertical encoding is used. The succeeding five bits indicate the pattern size while the following bits encode the new pattern on a pixel-by-pixel (bit map) basis. The sixth and final pattern is also new and is encoded similarly. However, a five bit new pattern code word is not needed, since after sorting all new patterns appear after all matched library patterns. The sequence shown in FIG. 17 concludes with a three-bit word (111) indicating the absence of further patterns from the current line.

FIG. 23 is a block diagram of a receiver arranged to recover the facsimile information encoded using the present invention as shown, for example, in FIG. 2. Information received from the transmitter of FIG. 2 via a transmission medium 2300 is stored in buffer 2301 and applied to a decoder 2302 which operates under timing control received from controller 2350. The received information is processed so as to extract horizontal (X) position information on line 2303 and vertical (Y) position information on line 2304 both of which are applied to an address generator 2310. This unit under control of timing signals received from controller 2350 supplies address information to a facsimile frame memory 2330 via line 2311.

The library identification number contained within the received signal is decoded in decoder 2302 and applied via line 2305 to a library update and management unit 2340 which is constructed substantially the same as unit 700 shown in FIG. 9. Unit 2340 also responsive to timing signals received from controller 2350 applies the appropriate pattern select numbers to pattern description memory 2307 for outputtings the pixel-by-pixel data to frame memory 2330 via line 2312. When the received information includes a new pattern description rather than a library ID number, information describing the new pattern is stored in memory 2307 via an input received from counter 2302 on line 2306.

What is claimed is:

1. A method of encoding a facsimile image including a plurality of picture elements (pixels) which lie along a series of scan lines, comprising the steps of:
   (a) comparing incoming patterns contained in portions of said image with a sequence of previously processed patterns stored in a library to determine the existence of a match between said incoming and stored patterns,
   (b) encoding, for each incoming pattern which matches a stored pattern, its location in said image and an identification number associated with said stored pattern, said encoding step being performed irrespective of whether said each incoming pattern intersects a border between said adjacent portions of said image, and
   (c) storing patterns in said library for which no matching pattern is found,
   wherein said storing step includes
   (d) arranging said patterns so that frequently occurring patterns are processed in said comparing step before infrequently occurring patterns.

2. The method defined in claim 1 further including the steps of:
   (e) storing at least one feature associated with each of said stored patterns, and
   (f) selecting ones of said stored patterns for said matching step based on the similarity between said stored features and at least one corresponding feature of said each incoming pattern.

3. A method of encoding a facsimile image including a plurality of picture elements (pixels) which lie along a series of scan lines comprising the steps of:
   (a) comparing incoming patterns contained in portions of said image with a sequence of previously processed patterns stored in a library to determine the existence of a match between said incoming and stored patterns,
   (b) encoding, for each incoming pattern which matches a stored pattern, its location in said image and an identification number associated with said stored pattern, and
   (c) storing patterns in said library for which no matching pattern is found,
   wherein said storing step includes
   (d) arranging said patterns so that frequently occurring patterns are processed in said comparing step before infrequently occurring patterns, and
   wherein said encoding step includes the steps of:
   (e) sorting identification numbers of those of said stored patterns which match incoming patterns on one of said scan lines in numerical order, and
   (f) differentially encoding said sorted identification numbers.

4. A method of encoding a facsimile image including a plurality of picture elements (pixels) which lie along a series of scan lines comprising the steps of:
   (a) comparing incoming patterns contained in portions of said image with a sequence of previously processed patterns stored in a library to determine the existence of a match between said incoming and stored patterns,
   (b) encoding, for each incoming pattern which matches a stored pattern, its location in said image and an identification number associated with said stored pattern, and
   (c) storing patterns in said library for which no matching pattern is found,
   wherein said storing step includes
   (d) arranging said patterns so that frequently occurring patterns are processed in said comparing step before infrequently occurring patterns, and
   wherein said comparing step includes the steps of:
   (e) comparing a sub-block of pixels in one of said incoming patterns with the corresponding sub-block of pixels in a selected stored pattern,
   (f) discontinuing said comparing step for said selected pattern and repeating said comparing step using another pattern in said sequence if said pixels in said sub-blocks differ by more than a predetermined amount, and
   (g) repeating said comparing step for remaining sub-blocks of pixels in said incoming pattern if said pixels in said sub-blocks do not differ by said predetermined amount.

5. A method of encoding a facsimile image including a plurality of picture elements (pixels) which lie along a series of scan lines comprising the steps of:
   (a) comparing incoming patterns contained in portions of said image with a sequence of previously processed patterns stored in a library to determine the existence of a match between said incoming and stored patterns,
   (b) encoding, for each incoming pattern which matches a stored pattern, its location in said image and an identification number associated with said stored pattern, and
   (c) storing patterns in said library for which no matching pattern is found,
   wherein said storing step includes
   (d) arranging said patterns so that frequently occurring patterns are processed in said comparing step before infrequently occurring patterns, wherein said method further includes the step of associating a low identification number with frequently occurring patterns.

6. Apparatus for encoding a facsimile signal representing the on/off status of elements (pixels) of a picture, said pixels lying along a plurality of scan lines, including:

pattern extraction means for extracting patterns from sequentially processed, contiguous regions of said picture, each of said patterns including a plurality of connected pixels, at least some of said patterns extending to a border between successively processed ones of said regions, means for storing a plurality of previously processed patterns each having an associated identification (ID) number, matching means jointly responsive to said extraction means and said storing means for comparing said extracted patterns with stored patterns, and coding means responsive to said matching means for encoding for each matching pattern (a) its location in said picture and (b) its associated identification number, and means for arranging said stored patterns such that frequently occurring patterns are matched before less frequently occurring patterns.

7. The invention defined in claim 6 wherein said apparatus further includes:

means for storing information describing selected features of patterns stored in said storing means, means for comparing for each selected feature of said extracted patterns, the corresponding features for patterns in said storing means, and means for applying patterns in said storing means to said matching means in response to an output from said feature comparison means.

8. Apparatus for encoding a facsimile signal representing the on/off status of elements (pixels) of a picture, said pixels lying along a plurality of scan lines, including:

pattern extraction means for extracting patterns from regions of said picture, each of said patterns including a plurality of connected pixels, means for storing a plurality of previously processed patterns each having an associated identification (ID) number, matching means jointly responsive to said extraction means and said storing means for comparing said extracted patterns with stored patterns, and coding means responsive to said matching means for encoding for each matching pattern (a) its location in said picture and (b) its associated identification number, and means for arranging said stored patterns such that frequently occurring patterns are matched before less frequently occurring patterns, wherein said feature comparing means includes:

means for individually comparing said selected features of said incoming and stored patterns using a variable threshold.

9. Apparatus for encoding a facsimile signal representing the on off status of elements (pixels) of a picture, said pixels lying along a plurality of scan lines, including:

pattern extraction means for extracting patterns from regions of said picture, each of said patterns including a plurality of connected pixels, means for storing a plurality of previously processed patterns each having an associated identification (ID) number, matching means jointly responsive to said extraction means and said storing means for comparing said extracted patterns with stored patterns, and coding means responsive to said matching means for encoding for each matching pattern (a) its location in said picture and (b) its associated identification number, and means for arranging said stored patterns such that frequently occurring patterns are matched before less frequently occurring patterns, wherein said stored pattern arranging means includes (a) means for storing information describing the association between said identification number and said stored patterns, and (b) means for rearranging said stored association information at the end of each of said scan lines that contain a pattern, whereby frequently matched patterns are associated with lower identification numbers.

10. The invention defined in claim 9 wherein said coding means includes:

means for sorting said identification numbers associated with matching patterns on a scan line in numerical order, and means for assigning a code word to each identification number as a function of its relation to the previous identification number.

11. The invention defined in claim 6 wherein said matching means includes:

means for sequentially comparing the on/off status of pixels in a sub-block within each pattern with the on/off status of pixels in the corresponding sub-block in a stored library pattern, and means for terminating the operation of said matching means for a particular stored pattern upon detection of a significant difference during said comparison sequence.

12. The invention defined in claim 8 wherein said feature comparing means is arranged to reduce said threshold if features for said stored patterns differ from the corresponding features of said incoming pattern.

13. Apparatus for encoding a signal representing the intensity values of elements (pixels) of a picture which lie along a series of scan lines, including:

(a) means for isolating patterns within blocks of pixels, each of said blocks including a plurality of border pixels between successively processed blocks, each isolated pattern comprising connected pixels with similar intensity values, ones of said isolated patterns including at least some of said border pixels, (b) first storing means for storing previously processed patterns and associated identification numbers, (c) means for matching each isolated pattern with selected stored patterns by sequentially comparing a sub-block of pixels in said isolated pattern with spatially corresponding sub-blocks in said selected stored patterns, (d) means responsive to said matching means for encoding (1) the location of a matched pattern in said picture, and (2) a code word representing said identification number associated with said matched pattern, and (e) means for selecting ones of said stored patterns for matching as a function of the frequency with which said patterns occurred in previously processed blocks of pixels.

14. Apparatus for encoding a signal representing the intensity values of elements (pixels) of a picture which lie along a series of scan lines, including:

(a) means for isolating patterns within blocks of pixels, each pattern comprising connected pixels with similar intensity values, (b) first storing means for storing previously processed patterns and associated identification numbers, (c) means for matching each isolated pattern with selected stored patterns by sequentially comparing a sub-block of pixels in said isolated pattern with spatially corresponding sub-blocks in said selected stored patterns, (d) means responsive to said matching means for encoding (1) the location of a matched pattern in said picture, and (2) a code word representing said identification number associated with said matched pattern, (e) means for selecting ones of said stored patterns for matching as a function of the frequency with which said patterns occurred in previously processed blocks of pixels, and (f) means for sorting identification numbers assigned to stored patterns which match patterns contained on one of said scan lines in said picture in numerical order, wherein said encoding means is arranged to differentially encode said sorted identification numbers.

15. The invention defined in claim 13 further including:

(g) second storing means for storing features of patterns contained in said first storing means, and (h) means for comparing features of each incoming pattern with said stored features, wherein said selecting means further includes means for selecting ones of said stored patterns for matching as a function of the similarity between said incoming pattern features and said stored pattern features.

16. The invention defined in claim 13 wherein said matching means includes means for terminating sequential comparison of sub-blocks in a pattern if its pixels differ from the pixels in said spatially corresponding sub-block by more than a predetermined amount.

* * * * *